(12) United States Patent
Xu et al.

(10) Patent No.: US 10,187,855 B2
(45) Date of Patent: Jan. 22, 2019

(54) MESSAGE PROCESSING METHOD AND APPARATUS

(71) Applicant: Huawei Technologies Co., Ltd., Shenzhen (CN)

(72) Inventors: Zhe Xu, Shenzhen (CN); Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/521,160

(22) PCT Filed: Nov. 28, 2014

(86) PCT No.: PCT/CN2014/092524
§ 371 (c)(1),
(2) Date: Apr. 21, 2017

(87) PCT Pub. No.: WO2016/082194
PCT Pub. Date: Jun. 2, 2016

(65) Prior Publication Data
US 2017/0325171 A1 Nov. 9, 2017

(51) Int. Cl.
*H04W 4/12* (2009.01)
*H04W 52/02* (2009.01)
(Continued)

(52) U.S. Cl.
CPC .... *H04W 52/0267* (2013.01); *G06F 21/6209* (2013.01); *G06F 21/84* (2013.01);
(Continued)

(58) Field of Classification Search
CPC .............. H04L 63/0428; H04L 9/3226; H04L 2209/80; H04L 51/18; H04L 9/0861;
(Continued)

(56) References Cited

U.S. PATENT DOCUMENTS

| | | |
|---|---|---|
| 2004/0143632 A1 | 7/2004 | McCarty |
| 2008/0052759 A1 | 2/2008 | Kronlund et al. |

(Continued)

FOREIGN PATENT DOCUMENTS

| | | |
|---|---|---|
| CN | 102752730 A | 10/2012 |
| CN | 103064585 A | 4/2013 |

(Continued)

*Primary Examiner* — Kwasi Karikari
(74) *Attorney, Agent, or Firm* — Slater Matsil, LLP

(57) ABSTRACT

Embodiments relate to a message processing method and apparatus. A first message is received that is sent by a first device to a second device. A determination is made as to whether the first message is a privacy message. When the first message is a privacy message, a second message is generated according to the first message, where the second message carries a first privacy label. The second message is sent to the second device, so that the second device displays a notification of the second message on a notification screen according to the first privacy label after receiving the second message. After receiving the second message, the second device displays the second message according to whether the second message carries the first privacy label.

17 Claims, 11 Drawing Sheets

(51) Int. Cl.
  *H04L 12/58* (2006.01)
  *H04L 29/08* (2006.01)
  *H04M 1/725* (2006.01)
  *H04W 4/14* (2009.01)
  *H04W 12/02* (2009.01)
  *G06F 21/62* (2013.01)
  *G06F 21/84* (2013.01)
  *G06Q 10/10* (2012.01)
  *G06Q 50/00* (2012.01)

(52) U.S. Cl.
  CPC .......... *G06Q 10/107* (2013.01); *G06Q 50/01* (2013.01); *H04L 51/04* (2013.01); *H04L 51/063* (2013.01); *H04L 51/18* (2013.01); *H04L 51/24* (2013.01); *H04L 67/26* (2013.01); *H04M 1/72552* (2013.01); *H04W 4/12* (2013.01); *H04W 4/14* (2013.01); *H04W 12/02* (2013.01); *G06F 2221/032* (2013.01); *Y02D 70/1222* (2018.01); *Y02D 70/1224* (2018.01); *Y02D 70/1262* (2018.01); *Y02D 70/142* (2018.01); *Y02D 70/144* (2018.01); *Y02D 70/26* (2018.01)

(58) Field of Classification Search
  CPC ......... H04L 9/14; H04L 63/083; H04L 51/00; H04L 63/0435; H04L 63/061; H04L 9/065; H04L 9/3242; H04L 9/3271; H04L 2463/041
  See application file for complete search history.

(56) References Cited

U.S. PATENT DOCUMENTS

| | | |
|---|---|---|
| 2014/0040394 A1 | 2/2014 | Tang et al. |
| 2014/0256288 A1 | 9/2014 | Allen |
| 2015/0007351 A1* | 1/2015 | Janajri ............ H04L 63/04 726/30 |
| 2015/0082446 A1* | 3/2015 | Flowers ............ G06F 3/0488 726/26 |

FOREIGN PATENT DOCUMENTS

| | | |
|---|---|---|
| CN | 103428652 A | 12/2013 |
| CN | 103561152 A | 2/2014 |
| CN | 103595766 A | 2/2014 |

* cited by examiner

MESSAGE PROCESSING METHOD AND APPARATUS

CROSS-REFERENCE TO RELATED APPLICATIONS

This application is a National Stage of International Application No. PCT/CN2014/092524, filed on Nov. 28, 2014, which application is hereby incorporated herein by reference.

TECHNICAL FIELD

The present invention relates to the field of communications technologies, and in particular, to a message processing method and apparatus.

BACKGROUND

With rapid development of communications technologies, an Android device, an iOS (iPhone Operating System) device, a Windows Phone device and the like all have a function of displaying a push message on a lock screen interface. That is, an application program (for example, a short message service message, a mailbox, or an instant messaging application) installed by a user on an intelligent terminal may present a received push message on a lock screen interface of the intelligent terminal. Then, the user may access, by clicking a push message entry, an application corresponding to the push message, to further browse all content of the push message. However, because various types of received push messages may be all displayed on the lock screen interface, a risk of leaking personal privacy of a user exists. Therefore, how to display a push message without leaking personal privacy of a user has become a focus of attention of a person skilled in the art.

In the prior art, generally two manners are used to display a push message. In a first manner, for an iOS system, whether a push message is displayed on a lock screen interface is set for each application in a notification center. An application for which it is set that a push message is displayed on a lock screen interface presents a push message corresponding to the application on the lock screen interface of the intelligent terminal. An application for which it is set that a push message is not displayed on a lock screen interface does not present a push message corresponding to the application on the lock screen interface of the intelligent terminal. In a second manner, for an Android L or jailbroken iOS system, a push message privacy level of an application is set on an API (Application Programming Interface). According to the set privacy level, push messages of different applications are displayed in different manners. For example, a push message of an application having a high privacy level is not displayed on the lock screen interface, and a push message of an application having a low privacy level may be displayed on the lock screen interface.

In a process of implementing the present invention, the inventor finds that the prior art has at least the following problems.

For the first manner, for an application that does not present a push message on a lock screen interface, all push messages received by the application in a lock screen state are not displayed, which affects in-time learning of an important push message by a user, and affects user experience and usability of a terminal device. For the second manner, because an application program receives a push message and determines whether to display the push message, the application program needs to be running in the background all the time, which is relatively power-consuming.

SUMMARY

To resolve the foregoing problems, embodiments of the present invention provide a message processing method and apparatus. The technical solutions are as follows.

According to a first aspect, a message processing method is provided. The method includes receiving a first message sent by a first device to a second device, and determining whether the first message is a privacy message. The method also includes, if the first message is a privacy message, generating a second message according to the first message, where the second message carries a first privacy label. The method further includes sending the second message to the second device, so that the second device displays a notification of the second message on a notification screen according to the first privacy label after receiving the second message.

In a first possible implementation manner of the first aspect, the determining whether the first message is a privacy message includes: determining, according to privacy data included in the first message, that the first message is a privacy message; and correspondingly, the generating a second message according to the first message includes: generating the second message according to the first message, and setting the first privacy label in the second message.

With reference to the first aspect, in a second possible implementation manner of the first aspect, the determining whether the first message is a privacy message includes: determining, according to a second privacy label included in the first message, that the first message is a privacy message; and correspondingly, the generating a second message according to the first message includes: generating the second message according to the first message, and setting the first privacy label in the second message.

With reference to the first aspect, and the first and second possible implementation manners of the first aspect, in a third possible implementation manner of the first aspect, the displaying a notification of the second message on a notification screen according to the first privacy label includes: skipping displaying a notification preview of the second message on the notification screen of the second device.

According to a second aspect, a message processing method is provided. The method includes receiving a first message sent by a first device to a second device, and determining whether the first message is a privacy message. The method also includes, if the first message is a privacy message, generating a second message according to the first message, where the second message does not include at least one piece of privacy content in the first message. The method further includes sending the second message to the second device, so that the second device displays a notification of the second message on a notification screen after receiving the second message.

In a first possible implementation manner of the second aspect, the determining whether the first message is a privacy message includes: determining, according to privacy data included in the first message, that the first message is a privacy message; and correspondingly, the generating a second message according to the first message includes: removing the at least one piece of privacy content in the first message, to obtain the second message.

According to a third aspect, a message processing method is provided. The method includes receiving a second message sent to a second device, and determining whether the second message includes a privacy label. The method also includes, when the second message includes a privacy label, skipping displaying a notification preview of the second message when the second device displays a notification of the second message on a notification screen. The method also includes, when the second message does not include a privacy label, displaying the notification of the second message on the notification screen of the second message according to a user setting.

In a first possible implementation manner of the third aspect, the skipping displaying a notification preview of the second message includes: when displaying the notification of the second message, skipping displaying specific content of the second message, and displaying only outline notification information that does not include the specific content of the second message.

According to a fourth aspect, a message processing apparatus is provided. The apparatus includes a first message receiving module, configured to receive a first message sent by a first device to a second device. The apparatus also includes a privacy message determining module, configured to determine whether the first message is a privacy message. The apparatus also includes a second message generation module, configured, when the first message is a privacy message, to generate a second message according to the first message, where the second message carries a first privacy label. The apparatus further includes a second message sending module, configured to send the second message to the second device, so that the second device displays a notification of the second message on a notification screen according to the first privacy label after receiving the second message.

In a first possible implementation manner of the fourth aspect, the privacy message determining module is configured to determine, according to privacy data included in the first message, that the first message is a privacy message; and correspondingly, the second message generation module is configured to generate the second message according to the first message, and set the first privacy label in the second message.

With reference to the fourth aspect, in a second possible implementation manner of the fourth aspect, the privacy message determining module is configured to determine, according to a second privacy label included in the first message, that the first message is a privacy message; and correspondingly, the second message generation module is configured to generate the second message according to the first message, and set the first privacy label in the second message.

With reference to the fourth aspect, and the first and the second possible implementation manners of the fourth aspect, in a third possible implementation manner of the fourth aspect, the second message sending module is configured to send the second message to the second device, so that the second device skips displaying a notification preview of the second message on the notification screen of the second device after receiving the second message.

According to a fifth aspect, a message processing apparatus is provided. The apparatus includes a first message receiving module, configured to receive a first message sent by a first device to a second device. The apparatus also includes a privacy message determining module, configured to determine whether the first message is a privacy message. The apparatus also includes a second message generation module, configured, when the first message is a privacy message, to generate a second message according to the first message, where the second message does not include at least one piece of privacy content in the first message. The apparatus further includes a second message sending module, configured to send the second message to the second device, so that the second device displays a notification of the second message on a notification screen after receiving the second message.

In a first possible implementation manner of the fifth aspect, the privacy message determining module is configured to determine, according to privacy data included in the first message, that the first message is a privacy message; and correspondingly, the second message generation module is configured to remove the at least one piece of privacy content in the first message, to obtain the second message.

In a first possible implementation manner of the sixth aspect, the first displaying module is configured, when displaying the notification of second message, to skip displaying specific content of the second message, and display only outline notification information that does not include the specific content of the second message.

The technical solutions provided in the embodiments of the present invention have the following beneficial effects.

After a first message sent to a second device is received, it is determined whether the first message is a privacy message; if the first message is a privacy message, a second message carrying a first privacy label is generated according to the first message; and then, the second message is sent to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
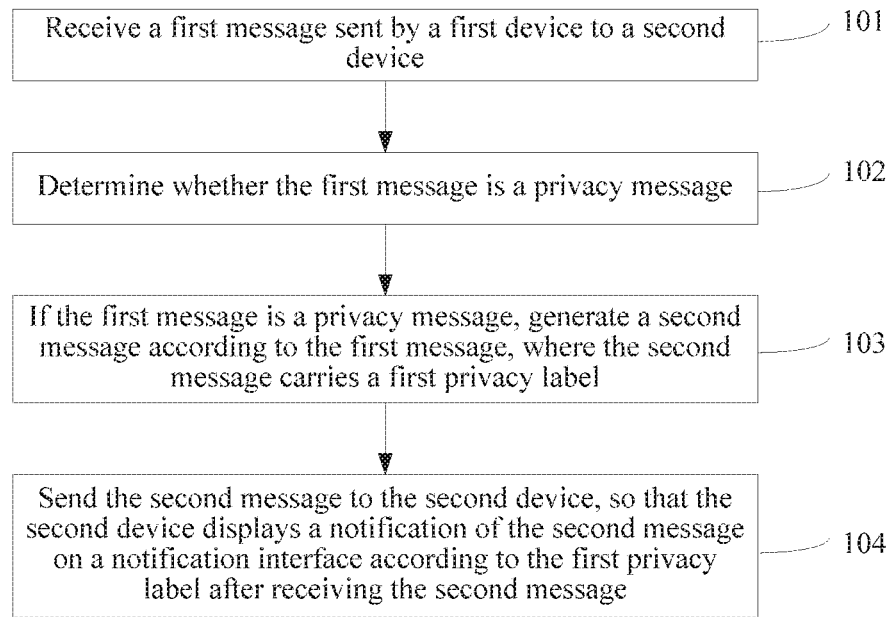
FIG. 1 is a flowchart of a message processing method according to an embodiment of the present invention.

FIG. 1 is a flowchart of a message processing method according to an embodiment of the present invention. Using an example in which an application server executes the method, referring to FIG. 1, a process of the method provided in this embodiment of the present invention includes the following steps.

101: Receive a first message sent by a first device to a second device.

The first device is a message sender, and the second device is a message receiver.

102: Determine whether the first message is a privacy message; and if the first message is a privacy message, perform step 102; or if the first message is not a privacy message, directly perform step 104.

103: If the first message is a privacy message, generate a second message according to the first message, where the second message carries a first privacy label.

104: Send the second message to the second device, so that the second device displays a notification of the second message on a notification screen according to the first privacy label after receiving the second message.

According to the method provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Optionally, the determining whether the first message is a privacy message includes: determining, according to privacy data included in the first message, that the first message is a privacy message; and correspondingly, the generating a second message according to the first message includes: generating the second message according to the first message, and setting the first privacy label in the second message.

Optionally, the determining whether the first message is a privacy message includes: determining, according to a second privacy label included in the first message, that the first message is a privacy message; and correspondingly, the generating a second message according to the first message includes: generating the second message according to the first message, and setting the first privacy label in the second message.

Optionally, the displaying a notification of the second message on a notification screen according to the first privacy label includes: skipping displaying a notification preview of the second message on the notification screen of the second device.

All the foregoing optional technical solutions can be randomly combined to form optional embodiments of the present invention, and details are not described herein.

Figure 2:
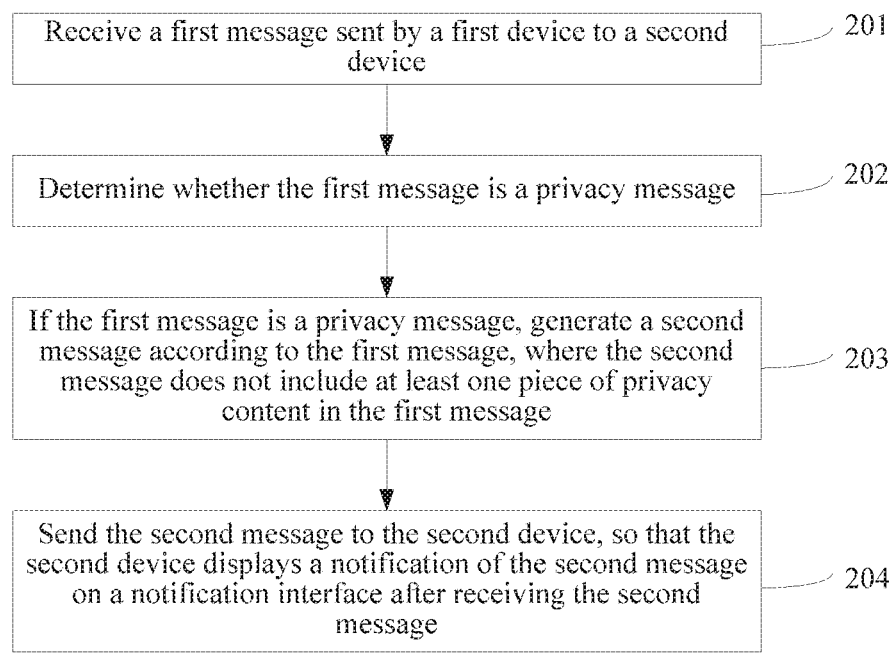
FIG. 2 is a flowchart of a message processing method according to an embodiment of the present invention.

FIG. 2 is a flowchart of a message processing method according to an embodiment of the present invention. Using an example in which an application server executes the method, referring to FIG. 2, a process of the method provided in this embodiment of the present invention includes the following steps.

201: Receive a first message sent by a first device to a second device.

202: Determine whether the first message is a privacy message; and if the first message is a privacy message, perform step 203; or if the first message is not a privacy message, directly perform step 204.

203: If the first message is a privacy message, generate a second message according to the first message, where the second message does not include at least one piece of privacy content in the first message.

204: Send the second message to the second device, so that the second device displays a notification of the second message on a notification screen after receiving the second message.

According to the method provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Optionally, the determining whether the first message is a privacy message includes: determining, according to privacy data included in the first message, that the first message is a privacy message; and correspondingly, the generating a second message according to the first message includes: removing the at least one piece of privacy content in the first message, to obtain the second message.

All the foregoing optional technical solutions can be randomly combined to form optional embodiments of the present invention, and details are not described herein.

Figure 3:
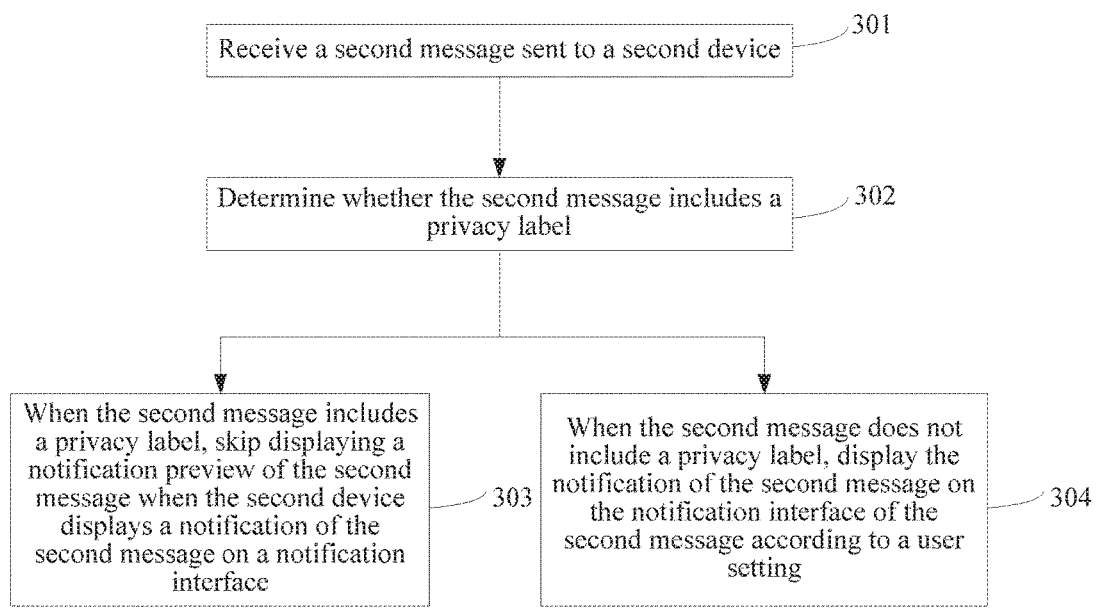
FIG. 3 is a flowchart of a message processing method according to an embodiment of the present invention.

FIG. 3 is a flowchart of a message processing method according to an embodiment of the present invention. Using an example in which a second device executes the method, referring to FIG. 3, a process of the method provided in this embodiment of the present invention includes the following steps.

301: Receive a second message sent to a second device.

302: Determine whether the second message includes a privacy label; and if the second message includes a privacy label, perform step 303; or if the second message does not include a privacy label, perform step 304.

303: When the second message includes a privacy label, skip displaying a notification preview of the second message when the second device displays a notification of the second message on a notification screen.

304: When the second message does not include a privacy label, display the notification of the second message on the notification screen of the second message according to a user setting.

According to the method provided in this embodiment of the present invention, after receiving a first message sent to a second device, an application server determines whether the first message is a privacy message. If the first message is a privacy message, the application server generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Optionally, the skipping displaying a notification preview of the second message includes: when displaying the notification of the second message, skipping displaying specific content of the second message, and displaying only outline notification information that does not include the specific content of the second message.

All the foregoing optional technical solutions can be randomly combined to form optional embodiments of the present invention, and details are not described herein.

Figure 4:
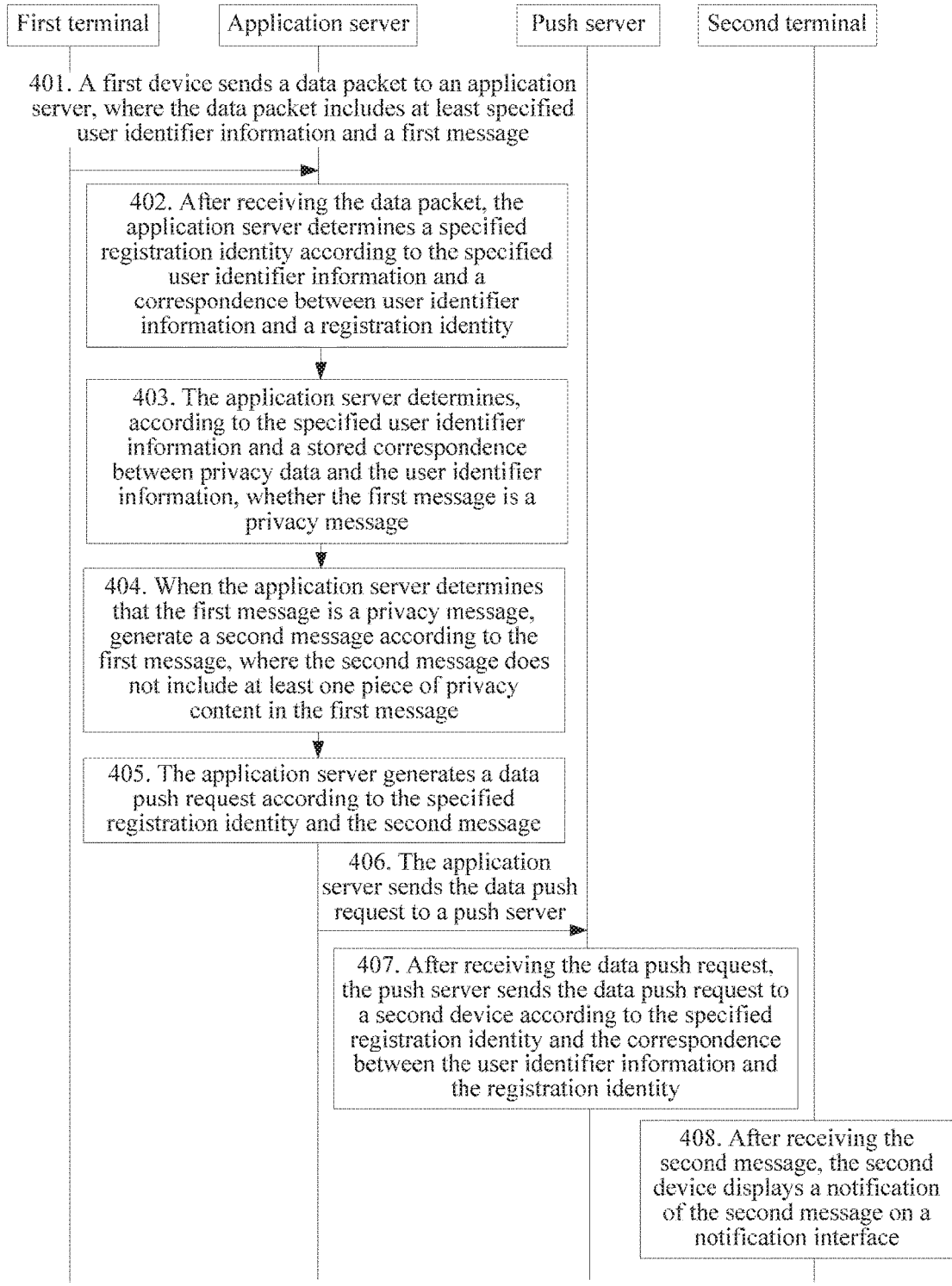
FIG. 4 is a flowchart of a message processing method according to an embodiment of the present invention.

FIG. 4 is a flowchart of a message processing method according to an embodiment of the present invention. Interaction bodies are a first device, a second device, an application server, and a push server. Using an example in which a data packet includes specified user identifier information and a first message, and a second message does not carry a first privacy label, referring to FIG. 4, a process of the method provided in this embodiment of the present invention includes the following step.

401: The first device sends a data packet to the application server, where the data packet includes at least specified user identifier information and a first message.

In this embodiment of the present invention, the first device refers to a message sender, and may be a mobile terminal such as a smartphone or a tablet computer, or a fixed receiving device such as a personal computer, or may be a server of a social application or an instant messaging application. A type of the first device is not specifically limited in this embodiment of the present invention. The specified user identifier information is used to indicate a receiver of the first message, and may be a telephone number, a login name of a particular application, a mailbox, or the like. A form of the specified user identifier information is also not specifically limited in this embodiment of the present invention.

In addition, besides the specified user identifier information and the first message, the data packet may further include other content, for example, a privacy label, or a data packet sending time, which is not specifically limited in this embodiment of the present invention. The first device may send the data packet to the application server in a wired manner, or a wireless manner, which is also not specifically limited in this embodiment of the present invention.

Figure 5:
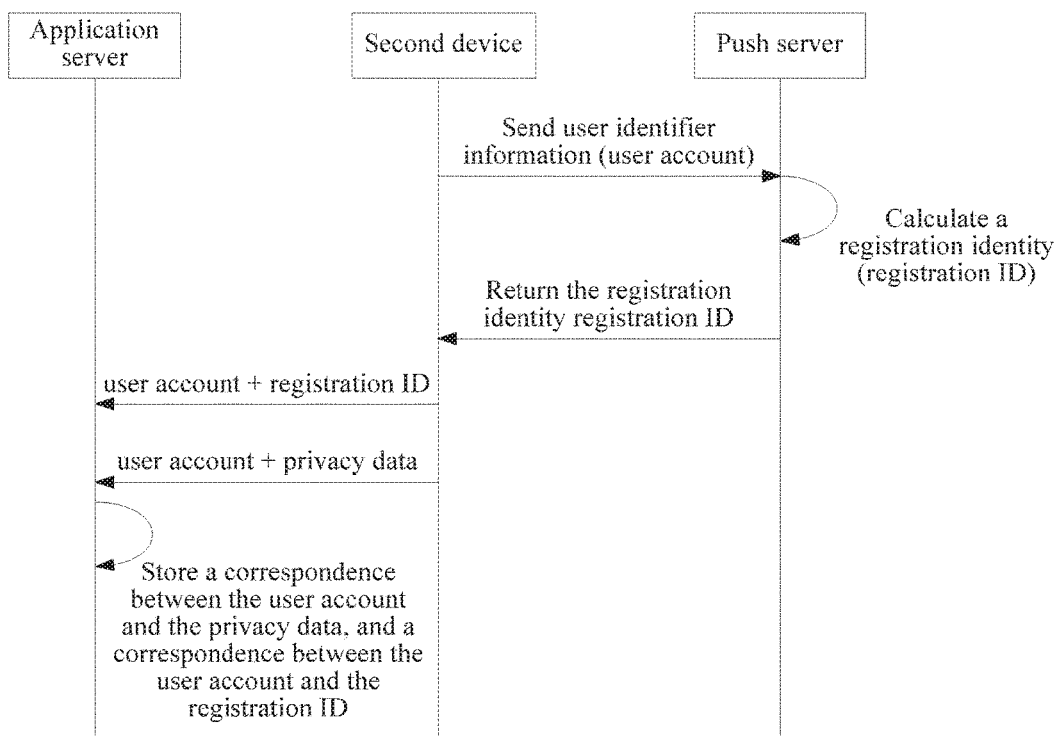
FIG. 5 is a schematic diagram showing that an application server registers privacy data according to an embodiment of the present invention.

It should be noted that, referring to FIG. 5, before the foregoing step 401 is performed, this embodiment of the present invention further includes a process in which the application server performs privacy registration, and a specific process may be divided into the following five steps.

First step: The second device sends the specified user identifier information to the push server.

In this embodiment of the present invention, the second device refers to a message receiver.

Second step: After receiving the specified user identifier information, the push server calculates a specified registration identity corresponding to the specified user identifier information, and sends the specified registration identity to the second device.

For the second step, the specified registration identity may be a character string including only letters, or a character string including both numbers and letters, or the like. A form of the specified registration identity is not specifically limited in this embodiment of the present invention. When the push server calculates the specified registration identity corresponding to the specified user identifier, refer to the prior art, and details are not described herein.

Third step: After receiving the specified registration identity, the second device sets a correspondence between a specified subscriber identity and the specified registration identity, and sends the correspondence between the specified user identifier information and the specified registration identity to the application server.

For the third step, when setting the correspondence between the specified subscriber identity and the specified registration identity, the second device may generate a corresponding entry shown in the first line in the following Table 1, that is, the second device generates only a single entry (a particular line) in Table 1. The entire correspondence table shown in Table 1 is formed by corresponding entries sent by multiple devices. After receiving a corresponding entry that is between the specified subscriber identity and the specified registration identity and that is sent by the second device, the application server may insert the entry into the table shown in the foregoing Table 1.

TABLE 1

| User identifier information | Registration identity |
|---|---|
| User identifier information A | Specified registration identity A |
| ... | ... |

Certainly, besides the foregoing manner of generating and sending a correspondence, another manner may be used, which is not specifically limited in this embodiment of the present invention. It should be noted that, a process of generating and storing the foregoing Table 1 (the entire table) may be implemented on the application server, or may be implemented on the push server, which is not specifically limited in this embodiment of the present invention. This embodiment of the present invention is described by using only an example in which the application server generates and stores the foregoing Table 1.

Fourth step: The second device acquires privacy data set by a user, and sends the privacy data and the corresponding specified user identifier information to the application server.

For the fourth step, the privacy data may be set by the user according to the following rules.

Rule 1: For any application (for example, a communications application, a short message service message, WeChat, or a mail), the user may set an application program level of the application to privacy data, push messages of the application are all processed as privacy messages, and specific content of the push messages is not displayed when a screen is not unlocked.

Rule 2: For a contact (for example, a privacy contact, a bank customer service, or Alipay), a user may set a contact level of the contact to privacy data, and the contact may be obtained by means of matching in an application program address book, a system address book, or a mailbox contact address book. Messages sent by the contact are all processed as privacy messages no matter whether the messages are sent by a mail or another communications tool such as WeChat. Specific content of push messages is not displayed when a screen is not unlocked.

Rule 3: For a keyword (for example, a transaction volume, receiving an expense receipt, or a short message service verification code), a user may set the keyword to privacy data, and the keyword may be automatically identified by a system responsible for processing a privacy message. Push messages including the keyword are all processed as privacy messages, and specific content of the push messages is not displayed when a screen is not unlocked.

Rule 4: For user equipment in some time periods (for example, a working period, and a gathering period), and user equipment in some places (for example, a company, and outside), a location relationship between a user and the second device is detected by means of a bound wearable device, and different privacy processing manners are selected for push messages according to connection relationships of devices such as a bound vehicle-mounted device and a smart home device. Determining may be performed for the foregoing time periods, places, bound wearable devices separately, or determining may be performed comprehensively according to the foregoing factors.

After the user sets the privacy data according to the foregoing rules, the second device acquires the set privacy data, and uploads the set privacy data and the specified user identifier information together to the application server, to facilitate storage by the application server.

Fifth step: The application server stores the correspondence between the specified subscriber identity and the specified registration identity, and a correspondence between the privacy data and the specified user identifier information.

For the fifth step, the application server may store the two correspondences into a storage medium such as an internal memory or a flash memory. A type of the storage medium is not specifically limited in this embodiment of the present invention.

402: After receiving the data packet, the application server determines a specified registration identity according to the specified user identifier information and a correspondence between user identifier information and a registration identity.

In this embodiment of the present invention, the application server already stores the correspondence between the user identifier information and the registration identity. With enhancement of a server processing capability, the application server may store massive correspondences, including user identifier information and registration identities that are sent by thousands of receiving devices.

Specifically, the application server may determine the specified registration identity according to the specified user identifier information and the correspondence between the user identifier information and the registration identity by: searching the correspondence between the user identifier information and the registration identity according to the specified user identifier information, to determine a registration identity matching the specified user identifier information (for example, a registration identity in a same entry of the specified user identifier information), and determining the registration identity as the specified registration identity.

403: The application server determines, according to the specified user identifier information and a stored correspondence between privacy data and the user identifier information, whether the first message is a privacy message.

In this embodiment of the present invention, because the application server already stores the correspondence between the privacy data and the user identifier information in the foregoing step 401, after receiving the data packet sent by the first device, the application server may determine, according to the specified user identifier information, whether the first message is a privacy message. The privacy message refers to a message including privacy data.

Specifically, the application server may determine, according to the specified user identifier information and the stored correspondence between the privacy data and the user identifier information, whether the first message is a privacy message by: searching the correspondence between the privacy data and the user identifier information according to the specified user identifier information, to determine privacy data matching the specified user identifier information; determining whether the first message matches any data in the privacy data; and if the first message matches any data in the privacy data, determining that the first message is a privacy message, and continuing to perform the following step 404; or if the first message does not match any data in the privacy data, determining that the first message is not a privacy message, and ending a processing procedure.

Using an example in which the privacy data is a relatively sensitive keyword (for example, a transaction volume, receiving an expense receipt, or a short message service verification code), word segmentation processing may be performed on the first message, to obtain segmented words; the segmented words are separately compared with the privacy data; and if any segmented word matches one keyword in the privacy data, it is determined that the first message is a privacy message.

For privacy data of other types, a processing process is similar to the foregoing process, and details are not described herein again.

It should be noted that, when the first device and the application server perform the foregoing step 401 to step 403, the second device and the push server further perform the following interaction steps.

After the second device is connected to the Internet, the second device sends a stored registration identity to the push server; and after receiving the registration identity, the push server verifies whether the registration identity is legal, and obtains a verification result; and then, returns the verification result to the second device.

In this embodiment of the present invention, the push server verifies the second device to determine whether the registration identity stored in the second device is granted by the push server itself previously. If the registration identity is calculated by the push server in advance and returned to the second device, it is verified that the registration identity is legal, and a verification result including legal information is obtained; and the verification result is returned to the second device. If the registration identity is not a registration identity that is calculated by the push server in advance and that is returned to the second device, it is verified that the registration identity is illegal, and a verification result including illegal information is obtained; and the verification result is returned to the second device to prompt the second device that verification on the registration identity fails.

Certainly, besides the foregoing manner of verifying the registration identity, another verification manner may be used, which is not specifically limited in this embodiment of the present invention.

404: When the application server determines that the first message is a privacy message, generate a second message according to the first message, where the second message does not include at least one piece of privacy content in the first message.

Specifically, the second message may be generated according to the first message by: removing the at least one piece of privacy content in the first message, to obtain the second message. Certainly, besides the foregoing manner of generating the second message, another generating manner may be used, which is not specifically limited in this embodiment of the present invention.

In this embodiment of the present invention, when the first message is a privacy message, the first message may include multiple pieces of relatively sensitive privacy content. For example, when the first message is a delivery message of an online payment verification code, the first message may include multiple pieces of privacy content such as an amount, a bank card number, and a verification code.

In this case, when the second message is generated according to the first message, it may be selected that some privacy content in the first message is replaced, hidden, or modified, so that the second message includes some privacy content in the first message; or it may be selected that all privacy content in the first message is replaced, hidden, or modified, so that the second message does not include any privacy content in the first message. In this case, the second message does not include any sensitive word.

For example, when the second message does not include some privacy content in the first message, the second message may be in a form such as "XX transfers XXX yuan RMB to you", or "XX makes a transfer to you"; when the second message does not include any privacy content in the first message, the second message may be in a form such as "You have a new transfer record", which is not specifically limited in this embodiment of the present invention.

405: The application server generates a data push request according to the specified registration identity and the second message.

In this embodiment of the present invention, to implement message pushing (Push Notification), three objects need to be involved:

1. A receiving device, which receives the second message and performs corresponding processing according to message content;
2. An application server, which sends the second message to a push server; and
3. The push server, which receives a data push request from the application server, and sends the data push request to the receiving device.

Based on the foregoing rule, after obtaining the second message, the application server further needs to generate a data push request. The data push request includes at least the specified registration identity and the second message. Certainly, besides the foregoing content, the data push request may further include other content, for example, a time at which the data push request is generated, which is not specifically limited in this embodiment of the present invention.

406: The application server sends the data push request to the push server.

In this embodiment of the present invention, the application server may send the data push request in a wireless or wired manner after packaging the data push request; or may directly send the data push request in a wireless or wired manner, which is not specifically limited in this embodiment of the present invention.

407: After receiving the data push request, the push server sends the data push request to the second device according to the specified registration identity and the correspondence between the user identifier information and the registration identity.

In this embodiment of the present invention, because the push server already stores the correspondence between the user identifier information and the registration identity, after receiving the data push request, the push server may determine corresponding specified user identifier information according to the specified registration identity. Further, a receiving device to which the second message is sent may be determined according to the specified user identifier information.

Specifically, the push server may send the data push request to the second device according to the specified registration identity and the correspondence between the user identifier information and the registration identity by: searching the correspondence between the user identifier information and the registration identity according to the specified registration identity, to determine specified user identifier information matching the specified registration identity; and sending the data push request to the second device according to the specified user identifier information.

408: After receiving the second message, the second device displays a notification of the second message on the notification screen.

In this embodiment of the present invention, the notification screen may be a lock screen interface, or may be a system notification screen, an application main screen, or a terminal desktop besides the lock screen interface. A type of the notification screen is not specifically limited in this embodiment of the present invention.

After receiving the second message, the second device may directly display the second message on the lock screen interface if the second device is in a lock screen status. In this case, the notification of the second message may be in a form such as "XX makes a transfer to you", "You have ** new messages", or "You have a new transfer record". Therefore, even if another person sees the notification, personal privacy of a user cannot be leaked.

Preferably, to prevent leakage of user privacy, a notification preview of the second message may not be displayed on the notification screen, that is, no related sensitive word is displayed. Only an outline notification message in a form such as "You have ** new messages", or "You have a new transfer record" is displayed, which is not specifically limited in this embodiment of the present invention.

In addition, if the second message is displayed on the lock screen interface currently, unlock prompt information may also be displayed on the lock screen interface, to prompt the user to perform an unlocking operation, to view details of the second message. After the user unlocks the second device, the second device sends an entire push message request to the application server. After receiving the entire push message request, the application server sends an entire second message including a privacy message to the second device.

According to the method provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Figure 6:
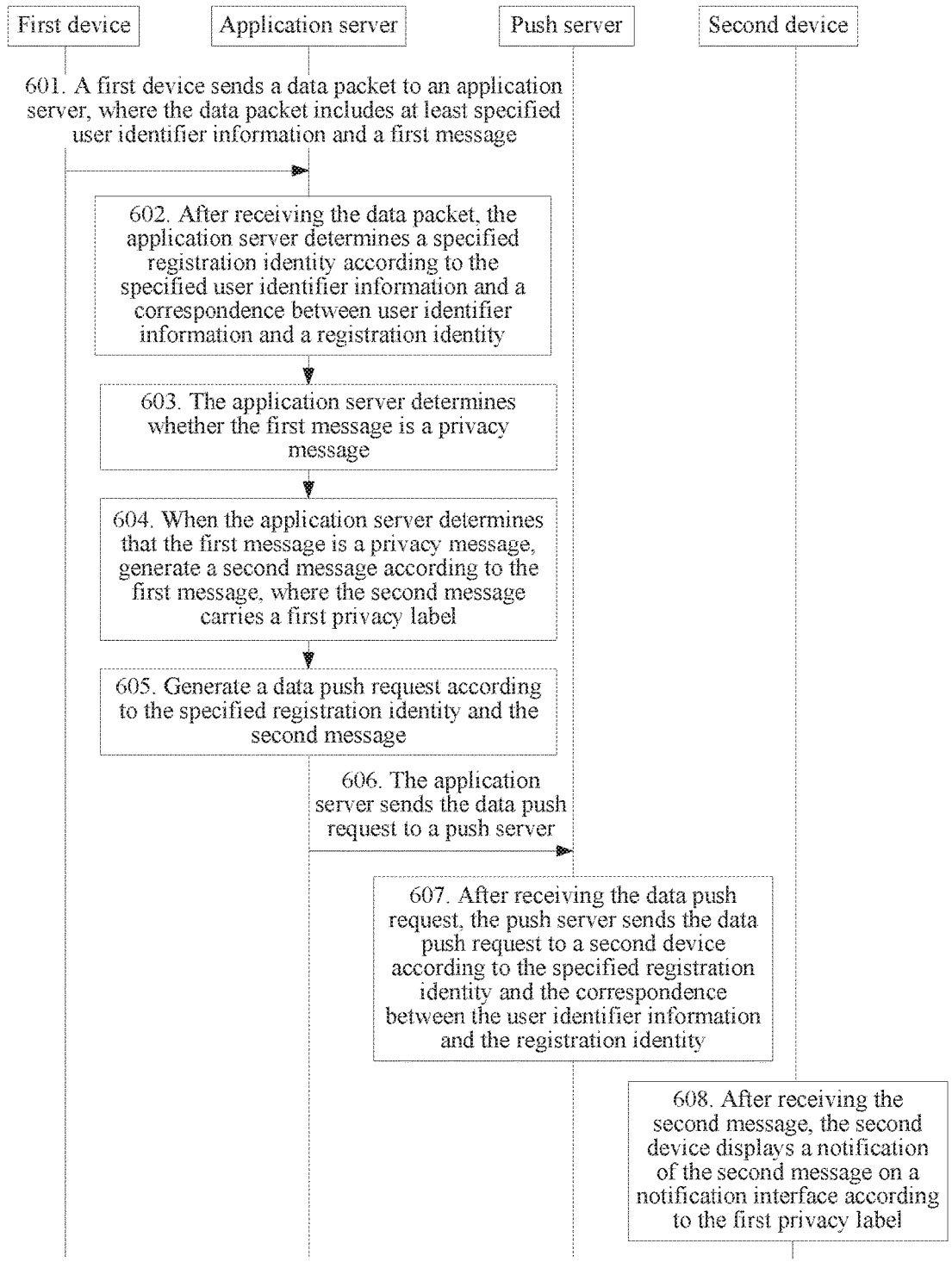
FIG. 6 is a flowchart of a message processing method according to an embodiment of the present invention.

FIG. 6 is a flowchart of a message processing method according to an embodiment of the present invention. Interaction bodies are a first device, a second device, an application server, and a push server. Using an example in which a data packet includes specified user identifier information and a first message, and a second message carries a first privacy label, referring to FIG. 6, a process of the method provided in this embodiment of the present invention includes:

601: The first device sends a data packet to the application server, where the data packet includes at least specified user identifier information and a first message.

In this embodiment of the present invention, the first device refers to a message sender, and may be a mobile terminal such as a smartphone or a tablet computer, or a fixed receiving device such as a personal computer, or may be a server of a social application or an instant messaging application. A type of the first device is not specifically limited in this embodiment of the present invention. The specified user identifier information is used to indicate a receiver of the first message, and may be a telephone number, a login name of a particular application, a mailbox, or the like. A form of the specified user identifier information is also not specifically limited in this embodiment of the present invention.

In addition, besides the specified user identifier information and the first message, the data packet may further include other content, for example, a privacy label, or a data packet sending time, which is not specifically limited in this embodiment of the present invention. The first device may send the data packet to the application server in a wired manner, or a wireless manner, which is also not specifically limited in this embodiment of the present invention.

It should be noted that, referring to FIG. 5, before the foregoing step 601 is performed, this embodiment of the present invention further includes a process in which the application server performs privacy registration, and a specific process may be divided into the following five steps:

First step: The second device sends the specified user identifier information to the push server.

In this embodiment of the present invention, the second device refers to a message receiver.

Second step: After receiving the specified user identifier information, the push server calculates a specified registration identity corresponding to the specified user identifier information, and sends the specified registration identity to the second device.

For the second step, the specified registration identity may be a character string including only letters, or a character string including both numbers and letters, or the like. A form of the specified registration identity is not specifically limited in this embodiment of the present invention. When the push server calculates the specified registration identity corresponding to the specified user identifier, refer to the prior art, and details are not described herein.

Third step: After receiving the specified registration identity, the second device sets a correspondence between a specified subscriber identity and the specified registration identity, and sends the correspondence between the specified user identifier information and the specified registration identity to the application server.

For the third step, when setting the correspondence between the specified subscriber identity and the specified registration identity, the second device may generate a corresponding entry shown in the first line in the foregoing Table 1, that is, the second device generates only a single entry (a particular line) in Table 1. The entire correspondence table shown in Table 1 is formed by corresponding entries sent by multiple devices. After receiving a corresponding entry that is between the specified subscriber identity and the specified registration identity and that is sent by the second device, the application server may insert the entry into the table shown in the foregoing Table 1.

Certainly, besides the foregoing manner of generating and sending a correspondence, another manner may be used, which is not specifically limited in this embodiment of the present invention.

Fourth step: The second device acquires privacy data set by a user, and sends the privacy data and the corresponding specified user identifier information to the application server.

For the fourth step, the privacy data may be set by the user according to the following rules:

Rule 1: For any application (for example, a communications application, a short message service message, WeChat, or a mail), the user may set an application program level of the application to privacy data, push messages of the application are all processed as privacy messages, and specific content of the push messages is not displayed when a screen is not unlocked.

Rule 2: For a contact (for example, a privacy contact, a bank customer service, or Alipay), a user may set a contact level of the contact to privacy data, and the contact may be obtained by means of matching in an application program address book, a system address book, or a mailbox contact address book. Messages sent by the contact are all processed as privacy messages no matter whether the messages are sent by a mail or another communications tool such as WeChat. Specific content of push messages is not displayed when a screen is not unlocked.

Rule 3: For a keyword (for example, a transaction volume, receiving an expense receipt, or a short message service verification code), a user may set the keyword to privacy data, and the keyword may be automatically identified by a system responsible for processing a privacy message. Push messages including the keyword are all processed as privacy messages, and specific content of the push messages is not displayed when a screen is not unlocked.

Rule 4: For user equipment in some time periods (for example, a working period, and a gathering period), and user equipment in some places (for example, a company, and outside), a location relationship between a user and the second device is detected by means of a bound wearable device, and different privacy processing manners are selected for push messages according to connection relationships of devices such as a bound vehicle-mounted device and a smart home device. Determining may be performed for the foregoing time periods, places, bound wearable devices separately, or determining may be performed comprehensively according to the foregoing factors.

After the user sets the privacy data according to the foregoing rules, the second device acquires the set privacy data, and uploads the set privacy data and the specified user identifier information together to the application server, to facilitate storage by the application server.

Fifth step: The application server stores the correspondence between the specified subscriber identity and the specified registration identity, and a correspondence between the privacy data and the specified user identifier information.

For the fifth step, the application server may store the two correspondences into a storage medium such as an internal memory or a flash memory. A type of the storage medium is not specifically limited in this embodiment of the present invention.

602: After receiving the data packet, the application server determines a specified registration identity according to the specified user identifier information and a correspondence between user identifier information and a registration identity.

In this embodiment of the present invention, the application server already stores the correspondence between the user identifier information and the registration identity. With enhancement of a server processing capability, the application server may store massive correspondences, including user identifier information and registration identities that are sent by thousands of receiving devices.

Specifically, the application server may determine the specified registration identity according to the specified user identifier information and the correspondence between the user identifier information and the registration identity by: searching the correspondence between the user identifier information and the registration identity according to the specified user identifier information, to determine a registration identity matching the specified user identifier information (for example, a registration identity in a same entry of the specified user identifier information), and determining the registration identity as the specified registration identity.

603: The application server determines whether the first message is a privacy message; and when the first message is a privacy message, performs the following step 604.

In this embodiment of the present invention, the application server may determine whether the first message is a privacy message by: determining, according to whether the first message includes privacy data, whether the first message is a privacy message; when the first message includes privacy data, determining that the first message is a privacy message; and when the first message does not include privacy data, determining that the first message is not a privacy message.

After receiving the data packet sent by the first device, the application server may determine, according to the specified user identifier information, whether the first message is a privacy message including the privacy data, because the application server already stores the correspondence between the privacy data and the user identifier information in the foregoing step 601.

Specifically, the application server may determine, according to the specified user identifier information and the stored correspondence between the privacy data and the user identifier information, whether the first message is a privacy message by: searching the correspondence between the privacy data and the user identifier information according to the specified user identifier information, to determine privacy data matching the specified user identifier information; determining whether the first message matches any data in the privacy data; and if the first message matches any data in the privacy data, determining that the first message is a privacy message, and continuing to perform the following step 604; or if the first message does not match any data in the privacy data, determining that the first message is not a privacy message, and ending a processing procedure.

Using an example in which the privacy data is a relatively sensitive keyword (for example, a transaction volume, receiving an expense receipt, or a short message service verification code), word segmentation processing may be performed on the first message, to obtain segmented words; the segmented words are separately compared with the privacy data; and if any segmented word matches one keyword in the privacy data, it is determined that the first message is a privacy message.

For privacy data of other types, a processing process is similar to the foregoing process, and details are not described herein again.

It should be noted that, when the first device and the application server perform the foregoing step 601 to step 603, the second device and the push server further perform the following interaction steps.

After the second device is connected to the Internet, the second device sends a stored registration identity to the push server; and after receiving the registration identity, the push server verifies whether the registration identity is legal, and obtains a verification result; and then, returns the verification result to the second device.

In this embodiment of the present invention, the push server verifies the second device to determine whether the registration identity stored in the second device is granted by the push server itself previously. If the registration identity is calculated by the push server in advance and returned to the second device, it is verified that the registration identity is legal, and a verification result including legal information is obtained; and the verification result is returned to the second device. If the registration identity is not a registration identity that is calculated by the push server in advance and that is returned to the second device, it is verified that the registration identity is illegal, and a verification result including illegal information is obtained; and the verification result is returned to the second device to prompt the second device that verification on the registration identity fails.

Certainly, besides the foregoing manner of verifying the registration identity, another verification manner may be used, which is not specifically limited in this embodiment of the present invention.

604: When the application server determines that the first message is a privacy message, generate a second message according to the first message, where the second message carries a first privacy label.

In this embodiment of the present invention, specifically, the application server may generate the second message according to the first message by: generating the second message according to the first message, and setting the first privacy label in the second message.

Because the application server already determines that the first message is a privacy message in the foregoing step 603, to protect user privacy, the first privacy label is inserted into the second message, to obtain the second message. Different privacy labels may be set for privacy levels of privacy messages. For example, privacy labels having two different levels, namely, private and secret, are set. A privacy label having a highest privacy level, that is, a privacy label being secret, may be set for a privacy message related to personal property, such as a bank customer service, an Alipay customer service, an involved transaction volume, or a short message service verification code; and a privacy label having a lower privacy level, that is, a privacy label being private, may be set for a push message sent by a particular application, which is not specifically limited in this embodiment of the present invention.

In this embodiment of the present invention, the application server may insert the first privacy label into the header of the second message, or may insert the first privacy label into the tail of the second message, or may insert the first privacy label by marking or setting a particular preset data bit in the second message, which is not specifically limited in this embodiment of the present invention.

The first privacy label may be set to a specified field in content of the second message, where a length may be one byte, one bit, or any length; and a location may be any location such as the header, the tail, or the middle of the second message, as long as the first privacy label can be identified by a message receiver. The form and the location of the first privacy label are both not specifically limited in this embodiment of the present invention.

605: Generate a data push request according to the specified registration identity and the second message.

In this embodiment of the present invention, to implement message pushing (Push Notification), three objects need to be involved:

1. A receiving device, which receives the second message and performs corresponding processing according to message content;
2. An application server, which sends the second message to a push server; and
3. The push server, which receives a data push request from the application server, and sends the data push request to the receiving device.

Based on the foregoing rule, after obtaining the second message, the application server further needs to generate a data push request. The data push request includes at least the specified registration identity and the second message. Certainly, besides the foregoing content, the data push request may further include other content, for example, a time at which the data push request is generated, which is not specifically limited in this embodiment of the present invention.

606: The application server sends the data push request to the push server.

In this embodiment of the present invention, the application server may send the data push request in a wireless or wired manner after packaging the data push request; or may directly send the data push request in a wireless or wired manner, which is not specifically limited in this embodiment of the present invention.

607: After receiving the data push request, the push server sends the data push request to the second device according to the specified registration identity and the correspondence between the user identifier information and the registration identity.

In this embodiment of the present invention, because the push server already stores the correspondence between the user identifier information and the registration identity, after receiving the data push request, the push server may determine corresponding specified user identifier information according to the specified registration identity. Further, a receiving device to which the second message is sent may be determined according to the specified user identifier information.

Specifically, the push server may send the data push request to the second device according to the specified registration identity and the correspondence between the user identifier information and the registration identity by: searching the correspondence between the user identifier information and the registration identity according to the specified registration identity, to determine specified user identifier information matching the specified registration identity; and sending the data push request to the second device according to the specified user identifier information.

608: After receiving the second message, the second device displays a notification of the second message on a notification screen according to the first privacy label.

Specifically, the notification of the second message may be displayed on the notification screen according to the first privacy label by: skipping displaying a notification preview of the second message on the notification screen of the second device, where the skipping displaying a notification preview of the second message refers to: when displaying the notification of the second message, skipping displaying specific content of the second message, and displaying only outline notification information that does not include the specific content of the second message.

In this embodiment of the present invention, after receiving the second message, the second device checks whether the second message includes a privacy label. In this case, because the second message includes the first privacy label, when displaying the notification of the second message, the second device first needs to process the second message. The second message may include multiple pieces of relatively sensitive privacy content. For example, when the second message is a delivery message of an online payment verification code, the second message may include multiple pieces of privacy content such as an amount, a bank card number, and a verification code.

In this case, it may be selected that some privacy content in the second message is replaced, hidden, or modified, so that the second message includes only some privacy content when being displayed on the notification screen; or it may be selected that all privacy content in the second message is replaced, hidden, or modified, so that the second message does not include any privacy content when being displayed on the notification screen. In this case, the second message does not include any sensitive word.

Preferably, to prevent leakage of user privacy, the notification preview of the second message may not be displayed on the notification screen, that is, no related sensitive word is displayed. Only an outline notification message in a form such as "You have ** new messages", or "You have a new transfer record" is displayed, which is not specifically limited in this embodiment of the present invention.

In conclusion, after receiving the second message, for privacy labels having different levels in the second message, the second device may display different message notifications for the privacy labels having different levels. For example: if the second message includes a privacy label having a highest level, only "You have one new message" is displayed to the user, and a message sender, an application used by the sender, a sending time, and content are all not displayed, and are viewed by the user by means of the second device; if the second message includes a privacy label having a lower privacy level, "You have one WeChat message from Zhang San" is displayed to the user, and specific content of the message is hidden; and if the second message does not include any privacy label, an entire notification of the second message may be displayed. Certainly, besides the foregoing displaying and processing manner for a privacy label, another displaying and processing manner may be used, which is not specifically limited in this embodiment of the present invention.

In addition, after a related notification is displayed on a lock screen interface, unlock prompt information may be further displayed on the lock screen interface, to prompt the user to perform an unlocking operation, to view the message.

According to the method provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

It should be noted that, privacy registration is performed on an application server side in the foregoing two embodiments, and privacy settings of the user on different devices may be synchronized. Receiving settings of privacy messages of a same user may be synchronized between multiple devices of the user. Privacy settings of the user for a same contact between different applications may be synchronized between multiple devices and multiple applications.

Figure 7:
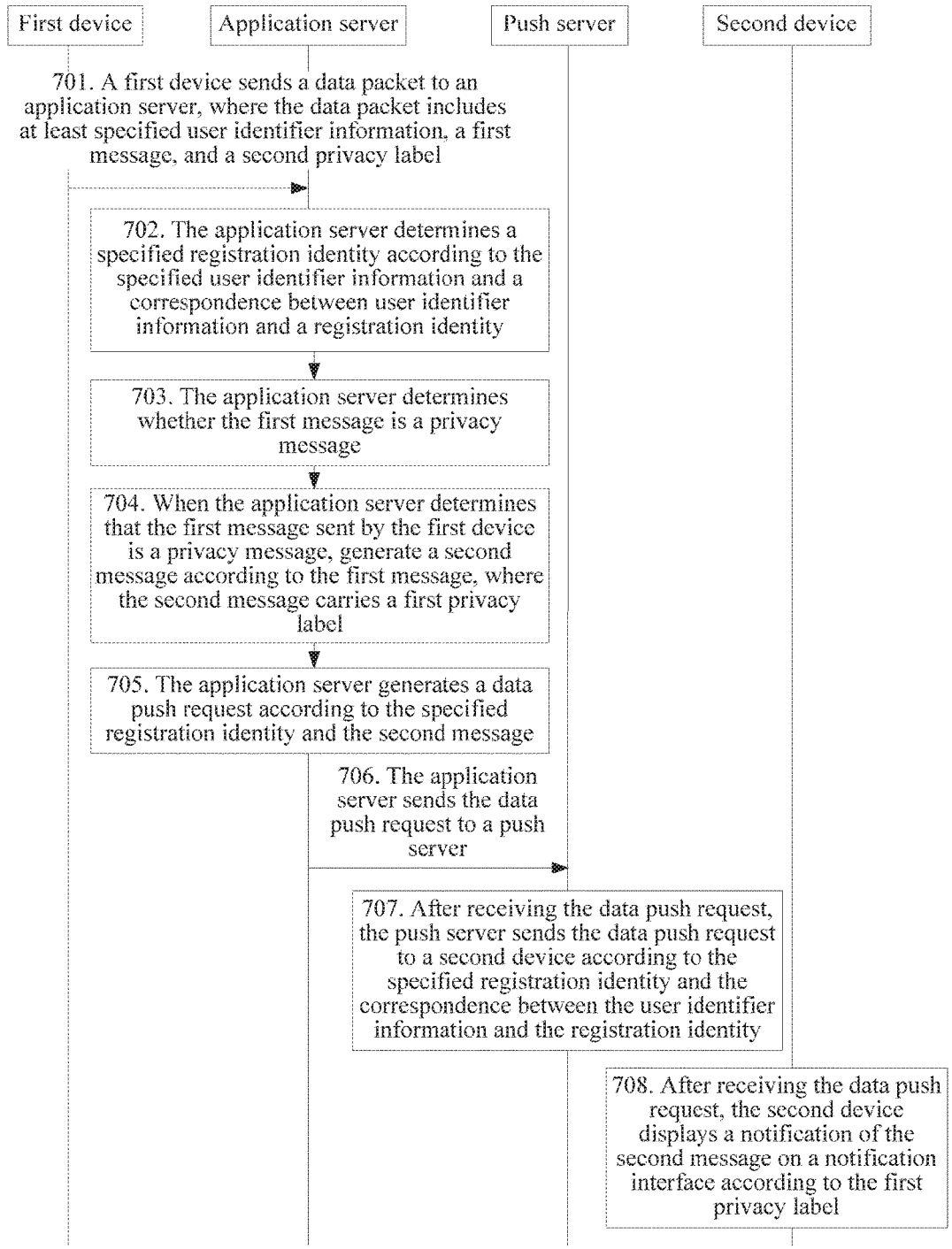
FIG. 7 is a flowchart of a message processing method according to an embodiment of the present invention.

FIG. 7 is a flowchart of a message processing method according to an embodiment of the present invention. Interaction bodies are a first device, a second device, an application server, and a push server. Using an example in which a data packet includes specified user identifier information, a first message, and a second privacy label, and a second message carries a first privacy label, referring to FIG. 7, a process of the method provided in this embodiment of the present invention includes:

701: The first device sends a data packet to the application server, where the data packet includes at least specified user identifier information, a first message, and a second privacy label.

In this embodiment of the present invention, the first device refers to a message sender, and may be a mobile terminal such as a smartphone or a tablet computer, or a fixed receiving device such as a personal computer, or may be a server of a social application or an instant messaging application. A type of the first device is not specifically limited in this embodiment of the present invention. The specified user identifier information is used to indicate a receiver of the first message, and may be a telephone number, a login name of a particular application, a mailbox, or the like. A form of the specified user identifier information is also not specifically limited in this embodiment of the present invention.

In addition, besides the specified user identifier information, the first message, and the second privacy label, the data packet may further include other content, for example, a data packet sending time, which is not specifically limited in this embodiment of the present invention. The first device may send the data packet to the application server in a wired manner, or a wireless manner, which is also not specifically limited in this embodiment of the present invention.

In this embodiment of the present invention, before the first device sends the data packet, a step of acquiring privacy data set by a user is further performed. For this step, the privacy data may be set by the user according to the following rules.

Rule 1: For any application (for example, a communications application, a short message service message, WeChat, or a mail), the user may set an application program level of the application to privacy data, push messages of the application are all processed as privacy messages, and specific content of the push messages is not displayed when a screen is not unlocked.

Rule 2: For a contact (for example, a privacy contact, a bank customer service, or Alipay), a user may set a contact level of the contact to privacy data, and the contact may be obtained by means of matching in an application program address book, a system address book, or a mailbox contact address book. Messages sent by the contact are all processed as privacy messages no matter whether the messages are sent by a mail or another communications tool such as WeChat. Specific content of push messages is not displayed when a screen is not unlocked.

Rule 3: For a keyword (for example, a transaction volume, receiving an expense receipt, or a short message service verification code), a user may set the keyword to privacy data, and the keyword may be automatically identified by a system responsible for processing a privacy message. Push messages including the keyword are all processed as privacy messages, and specific content of the push messages is not displayed when a screen is not unlocked.

Rule 4: For user equipment in some time periods (for example, a working period, and a gathering period), and user equipment in some places (for example, a company, and outside), a location relationship between a user and the second device is detected by means of a bound wearable device, and different privacy processing manners are selected for push messages according to connection relationships of devices such as a bound vehicle-mounted device and a smart home device. Determining may be performed for the foregoing time periods, places, bound wearable devices separately, or determining may be performed comprehensively according to the foregoing factors.

After the user sets the privacy data according to the foregoing rules, the second device acquires the set privacy data, and uploads the set privacy data and the specified user identifier information together to the application server, to facilitate storage by the application server.

Different second privacy labels may be set for privacy levels of privacy messages. For example, a second privacy label having a highest privacy level may be set for a privacy message related to personal property, such as a bank customer service, an Alipay customer service, an involved transaction volume, or a short message service verification code; and a second privacy label having a lower privacy level may be set for a push message sent by a particular application, which is not specifically limited in this embodiment of the present invention. The privacy level may be set and stored on the application server by the user in advance, or may be set by the system automatically, which is not specifically limited in this embodiment of the present invention.

In this embodiment of the present invention, the first device may insert the second privacy label into the header of the first message, or may insert the second privacy label into the tail of the first message, or may insert the second privacy label by marking or setting a particular preset data bit in the first message, which is not specifically limited in this embodiment of the present invention. The second privacy label may be set to a specified field in content of the first message, where a length may be one byte, one bit, or any length; and a location may be any location such as the header, the tail, or the middle of the first message, as long as the second privacy label can be identified by a message receiver. The form and the location of the second privacy label are both not specifically limited in this embodiment of the present invention.

Figure 8:
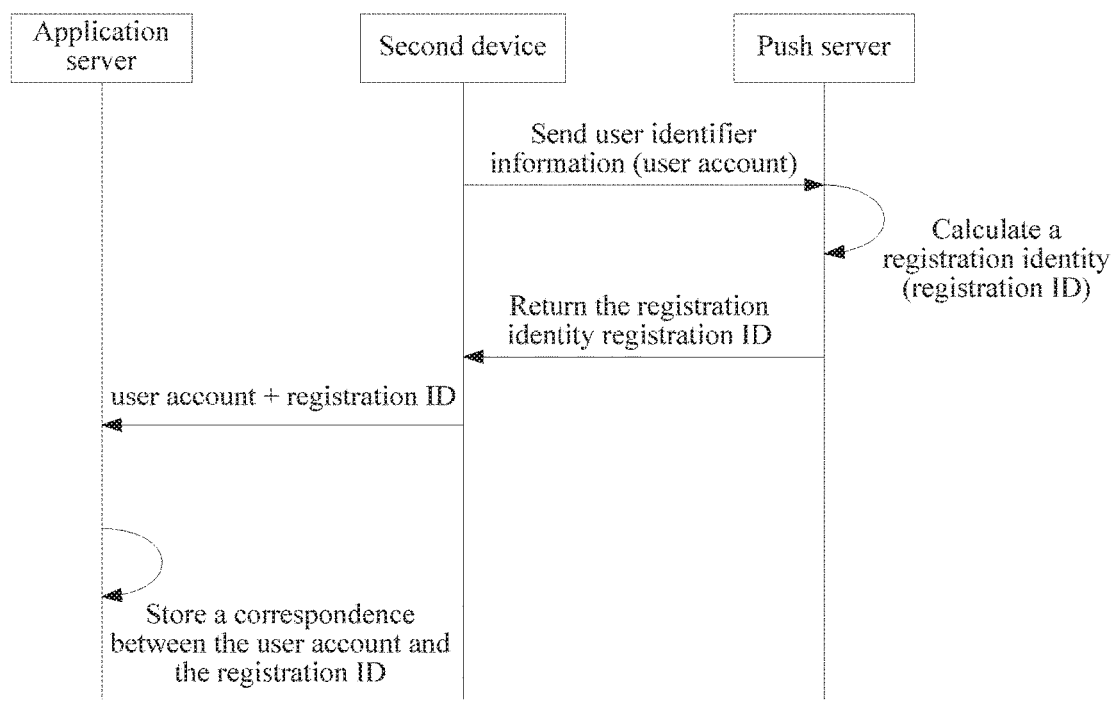
FIG. 8 is a schematic diagram of registering a push service according to an embodiment of the present invention.

It should be noted that, referring to FIG. 8, before the foregoing step 701 is performed, this embodiment of the present invention further includes a process of registering a push service, and a specific process may be divided into the following four steps:

First step: The second device sends the specified user identifier information to the push server.

In this embodiment of the present invention, the second device refers to a message receiver.

Second step: After receiving the specified user identifier information, the push server calculates a specified registration identity corresponding to the specified user identifier information, and sends the specified registration identity to the second device.

For the second step, the specified registration identity may be a character string including only letters, or a character string including both numbers and letters, or the like. A form of the specified registration identity is not specifically limited in this embodiment of the present invention. When the push server calculates the specified registration identity corresponding to the specified user identifier, refer to the prior art, and details are not described herein.

Third step: After receiving the specified registration identity, the second device sets a correspondence between a specified subscriber identity and the specified registration identity, and sends the correspondence between the specified user identifier information and the specified registration identity to the application server.

For the third step, when setting the correspondence between the specified subscriber identity and the specified registration identity, the second device may generate a corresponding entry shown in the first line in the foregoing Table 1, that is, the second device generates only a single entry (a particular line) in Table 1. The entire correspondence table shown in Table 1 is formed by corresponding entries sent by multiple devices. After receiving a corresponding entry that is between the specified subscriber identity and the specified registration identity and that is sent by the second device, the application server may insert the entry into the table shown in the foregoing Table 1.

Certainly, besides the foregoing manner of generating and sending a correspondence, another manner may be used, which is not specifically limited in this embodiment of the present invention.

Fourth step: The application server stores the correspondence between the specified subscriber identity and the specified registration identity.

For the fourth step, the application server may store the correspondence into a storage medium such as an internal memory or a flash memory. A type of the storage medium is not specifically limited in this embodiment of the present invention.

702: The application server determines a specified registration identity according to the specified user identifier information and a correspondence between user identifier information and a registration identity.

In this embodiment of the present invention, the application server already stores the correspondence between the user identifier information and the registration identity. With enhancement of a server processing capability, the application server may store massive correspondences, including user identifier information and registration identities that are sent by thousands of receiving devices.

Specifically, the application server may determine the specified registration identity according to the specified user identifier information and the correspondence between the user identifier information and the registration identity by: searching the correspondence between the user identifier information and the registration identity according to the specified user identifier information, to determine a registration identity matching the specified user identifier information (for example, a registration identity in a same entry of the specified user identifier information), and determining the registration identity as the specified registration identity.

It should be noted that, when the first device and the application server perform the foregoing step 701 to step 702, the second device and the push server further perform the following interaction steps.

After the second device is connected to the Internet, the second device sends a stored registration identity to the push server; and after receiving the registration identity, the push server verifies whether the registration identity is legal, and obtains a verification result; and then, returns the verification result to the second device.

In this embodiment of the present invention, the push server verifies the second device to determine whether the registration identity stored in the second device is granted by the push server itself previously. If the registration identity is calculated by the push server in advance and returned to the second device, it is verified that the registration identity is legal, and a verification result including legal information is obtained; and the verification result is returned to the second device. If the registration identity is not a registration identity that is calculated by the push server in advance and that is returned to the second device, it is verified that the registration identity is illegal, and a verification result including illegal information is obtained; and the verification result is returned to the second device to prompt the second device that verification on the registration identity fails.

Certainly, besides the foregoing manner of verifying the registration identity, another verification manner may be used, which is not specifically limited in this embodiment of the present invention.

703: The application server determines whether the first message is a privacy message; and when the first message is a privacy message, performs the following step 704.

In this embodiment of the present invention, specifically, the application server may determine whether the first message is a privacy message by: determining, according to whether the first message includes a second privacy label, whether the first message is a privacy message; when the first message includes a second privacy label, determining that the first message is a privacy message, and performing the following step 704; and when the first message does not include a second privacy label, determining that the first message is not a privacy message.

704: When the application server determines that the first message sent by the first device is a privacy message, generate a second message according to the first message, where the second message carries a first privacy label.

In this embodiment of the present invention, specifically, the application server may generate the second message according to the first message by: generating the second message according to the first message, and setting the first privacy label in the second message.

The first privacy label may be set to a specified field in content of the second message, where a length may be one byte, one bit, or any length; and a location may be any location such as the header, the tail, or the middle of the second message, as long as the first privacy label can be identified by a message receiver. The form and the location of the second privacy label are both not specifically limited in this embodiment of the present invention.

It should be noted that, in a case in which the first message carries the second privacy label, the reason why the first privacy label needs to be further set in the second message is that the following case may exist: because related protocols used by the first device and the application server may be different, the first privacy label may be a second privacy label that is obtained after format transformation or other related processing. The substantive functions of the first privacy label and the second privacy label are the same, and are to mark the privacy message, and an only difference is that: formats of privacy labels on different devices are different.

705: The application server generates a data push request according to the specified registration identity and the second message.

In this embodiment of the present invention, to implement message pushing (Push Notification), three objects need to be involved:

1. A receiving device, which receives the second message and performs corresponding processing according to message content;

2. An application server, which sends the second message to a push server; and

3. The push server, which receives a data push request from the application server, and sends the data push request to the receiving device.

Based on the foregoing rule, after obtaining the second message, the application server further needs to generate a data push request. The data push request includes at least the specified registration identity and the second message. Certainly, besides the foregoing content, the data push request may further include other content, for example, a time at which the data push request is generated, which is not specifically limited in this embodiment of the present invention.

706: The application server sends the data push request to the push server.

In this embodiment of the present invention, the application server may send the data push request in a wireless or wired manner after packaging the data push request; or may directly send the data push request in a wireless or wired manner, which is not specifically limited in this embodiment of the present invention.

707: After receiving the data push request, the push server sends the data push request to the second device according to the specified registration identity and the correspondence between the user identifier information and the registration identity.

In this embodiment of the present invention, because the push server already stores the correspondence between the user identifier information and the registration identity, after receiving the data push request, the push server may determine corresponding specified user identifier information according to the specified registration identity. Further, a receiving device to which the second message is sent may be determined according to the specified user identifier information.

Specifically, the push server may send the data push request to the second device according to the specified registration identity and the correspondence between the user identifier information and the registration identity by: searching the correspondence between the user identifier information and the registration identity according to the specified registration identity, to determine specified user identifier information matching the specified registration identity; and sending the data push request to the second device according to the specified user identifier information.

708: After receiving the data push request, the second device displays a notification of the second message on the notification screen according to the first privacy label.

Specifically, the notification of the second message may be displayed on the notification screen according to the first privacy label by: skipping displaying a notification preview of the second message on the notification screen of the second device, where the skipping displaying a notification preview of the second message refers to: when displaying the notification of the second message, skipping displaying specific content of the second message, and displaying only outline notification information that does not include the specific content of the second message.

In this embodiment of the present invention, after receiving the second message, the second device checks whether the second message includes a privacy label. In this case, because the second message includes the first privacy label, when displaying the notification of the second message, the second device first needs to process the second message. The second message may include multiple pieces of relatively sensitive privacy content. For example, when the second message is a delivery message of an online payment verification code, the second message may include multiple pieces of privacy content such as an amount, a bank card number, and a verification code.

In this case, it may be selected that some privacy content in the second message is replaced, hidden, or modified, so that the second message includes only some privacy content when being displayed on the notification screen; or it may be selected that all privacy content in the second message is replaced, hidden, or modified, so that the second message does not include any privacy content when being displayed on the notification screen. In this case, the second message does not include any sensitive word.

Preferably, to prevent leakage of user privacy, the notification preview of the second message may not be displayed on the notification screen, that is, no related sensitive word is displayed. Only an outline notification message in a form such as "You have ** new messages", or "You have a new transfer record" is displayed, which is not specifically limited in this embodiment of the present invention.

In conclusion, after receiving the second message, for privacy labels having different levels in the second message, the second device may display different message notifications for the privacy labels having different levels. For example: if the second message includes a privacy label having a highest level, only "You have one new message" is displayed to the user, and a message sender, an application used by the sender, a sending time, and content are all not displayed, and are viewed by the user by means of the second device; if the second message includes a privacy label having a lower privacy level, "You have one WeChat message from Zhang San" is displayed to the user, and specific content of the message is hidden; and if the second message does not include any privacy label, an entire notification of the second message may be displayed. Certainly, besides the foregoing displaying and processing manner for a privacy label, another displaying and processing manner may be used, which is not specifically limited in this embodiment of the present invention.

In addition, after a related notification is displayed on a lock screen interface, unlock prompt information may be further displayed on the lock screen interface, to prompt the user to perform an unlocking operation, to view the message.

According to the method provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

It should be noted that, in addition that a first device may send, to an application server, a first message that does not carry a second privacy label or a first message that carries a second privacy label, the first device may further send a second message to the application server, where the second message does not include any privacy content in the first message, or includes some privacy content in the first message. A specific process is as follows: generating a first message; determining whether the first message is a privacy message; when the first message is a privacy message, generating a second message according to the first message, where the second message does not include at least one piece of privacy content in the first message; and sending the second message to the application server, so that the second device displays a notification of the second message on a notification screen after receiving the second message forwarded by the application server. For detailed explanation and description of each step, refer to the detailed embodiment corresponding to the foregoing FIG. 4, FIG. 6 and FIG. 7, and details are not described herein again.

Figure 9:
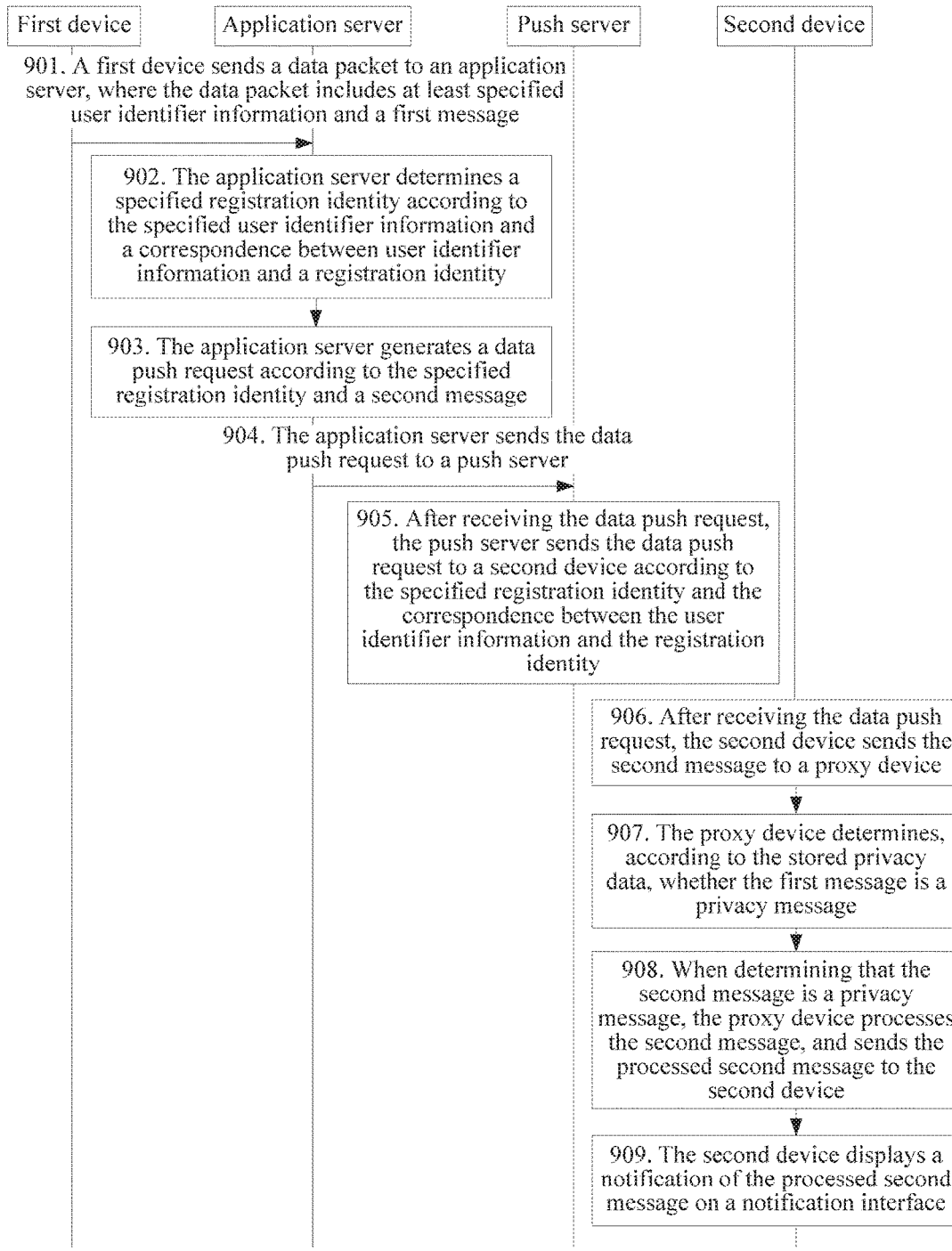
FIG. 9 is a flowchart of a message processing method according to an embodiment of the present invention.

FIG. 9 is a flowchart of a message processing method according to an embodiment of the present invention. Interaction bodies are a first device, a second device, an application server, a push server, and a proxy device. Using an example in which a data packet includes specified user identifier information and a first message, and a second message and the first message include same content, referring to FIG. 9, a process of the method provided in this embodiment of the present invention includes the following steps.

901: The first device sends a data packet to the application server, where the data packet includes at least specified user identifier information and a first message.

In this embodiment of the present invention, the first device refers to a message sender, and may be a mobile terminal such as a smartphone or a tablet computer, or a fixed receiving device such as a personal computer, or may be a server of a social application or an instant messaging application. A type of the first device is not specifically limited in this embodiment of the present invention. The specified user identifier information is used to indicate a receiver of the first message, and may be a telephone number, a login name of a particular application, a mailbox, or the like. A form of the specified user identifier information is also not specifically limited in this embodiment of the present invention.

In addition, besides the specified user identifier information and the first message, the data packet may further include other content, for example, a privacy label, or a data packet sending time, which is not specifically limited in this embodiment of the present invention. The first device may send the data packet to the application server in a wired manner, or a wireless manner, which is also not specifically limited in this embodiment of the present invention.

It should be noted that, referring to FIG. 8, before the foregoing step 901 is performed, this embodiment of the present invention further includes a process of registering a push service, and a specific process may be divided into the following four steps:

First step: The second device sends the specified user identifier information to the push server.

In this embodiment of the present invention, the second device refers to a message receiver.

Second step: After receiving the specified user identifier information, the push server calculates a specified registration identity corresponding to the specified user identifier information, and sends the specified registration identity to the second device.

For the second step, the specified registration identity may be a character string including only letters, or a character string including both numbers and letters, or the like. A form of the specified registration identity is not specifically limited in this embodiment of the present invention. When the push server calculates the specified registration identity corresponding to the specified user identifier, refer to the prior art, and details are not described herein.

Third step: After receiving the specified registration identity, the second device sets a correspondence between a specified subscriber identity and the specified registration identity, and sends the correspondence between the specified user identifier information and the specified registration identity to the application server.

For the third step, when setting the correspondence between the specified subscriber identity and the specified registration identity, the second device may generate a corresponding entry shown in the first line in the foregoing Table 1, that is, the second device generates only a single entry (a particular line) in Table 1. The entire correspondence table shown in Table 1 is formed by corresponding entries sent by multiple devices. After receiving a corresponding entry that is between the specified subscriber identity and the specified registration identity and that is sent by the second device, the application server may insert the entry into the table shown in the foregoing Table 1.

Certainly, besides the foregoing manner of generating and sending a correspondence, another manner may be used, which is not specifically limited in this embodiment of the present invention. It should be noted that, a process of generating and storing the foregoing Table 1 (entire table) may be implemented on the application server, or may be implemented on the push server, which is not specifically limited in this embodiment of the present invention. This embodiment of the present invention is described by using only an example in which the application server generates and stores the foregoing Table 1.

Fourth step: The application server stores the correspondence between the specified subscriber identity and the specified registration identity.

For the fourth step, the application server may store the correspondence into a storage medium such as an internal memory or a flash memory. A type of the storage medium is not specifically limited in this embodiment of the present invention.

902: The application server determines a specified registration identity according to the specified user identifier information and a correspondence between user identifier information and a registration identity.

In this embodiment of the present invention, the application server already stores the correspondence between the user identifier information and the registration identity. With enhancement of a server processing capability, the application server may store massive correspondences, including user identifier information and registration identities that are sent by thousands of receiving devices.

Specifically, the application server may determine the specified registration identity according to the specified user identifier information and the correspondence between the user identifier information and the registration identity by: searching the correspondence between the user identifier information and the registration identity according to the specified user identifier information, to determine a registration identity matching the specified user identifier information (for example, a registration identity in a same entry of the specified user identifier information), and determining the registration identity as the specified registration identity.

It should be noted that, when the first device and the application server perform the foregoing step 901 to step 902, the second device and the push server further perform the following interaction steps.

After the second device is connected to the Internet, the second device sends a stored registration identity to the push server; and after receiving the registration identity, the push server verifies whether the registration identity is legal, and obtains a verification result; and then, returns the verification result to the second device.

In this embodiment of the present invention, the push server verifies the second device to determine whether the registration identity stored in the second device is granted by the push server itself previously. If the registration identity is calculated by the push server in advance and returned to the second device, it is verified that the registration identity is legal, and a verification result including legal information is obtained; and the verification result is returned to the second device. If the registration identity is not a registration identity that is calculated by the push server in advance and that is returned to the second device, it is verified that the registration identity is illegal, and a verification result including illegal information is obtained; and the verification result is returned to the second device to prompt the second device that verification on the registration identity fails.

Certainly, besides the foregoing manner of verifying the registration identity, another verification manner may be used, which is not specifically limited in this embodiment of the present invention.

903: The application server generates a data push request according to the specified registration identity and the second message.

In this embodiment of the present invention, to implement message pushing (Push Notification), three objects need to be involved:
  1. A receiving device, which receives the second message and performs corresponding processing according to message content;
  2. An application server, which sends the second message to a push server; and
  3. The push server, which receives a data push request from the application server, and sends the data push request to the receiving device.

Based on the foregoing rule, after obtaining the second message, the application server further needs to generate a data push request. The data push request includes at least the specified registration identity and the second message. Certainly, besides the foregoing content, the data push request may further include other content, for example, a time at which the data push request is generated, which is not specifically limited in this embodiment of the present invention.

904: The application server sends the data push request to the push server.

In this embodiment of the present invention, the application server may send the data push request in a wireless or wired manner after packaging the data push request; or may directly send the data push request in a wireless or wired manner, which is not specifically limited in this embodiment of the present invention.

905: After receiving the data push request, the push server sends the data push request to the second device according to the specified registration identity and the correspondence between the user identifier information and the registration identity.

In this embodiment of the present invention, because the push server already stores the correspondence between the user identifier information and the registration identity, after receiving the data push request, the push server may determine corresponding specified user identifier information according to the specified registration identity. Further, a receiving device to which the second message is sent may be determined according to the specified user identifier information.

Specifically, the push server may send the data push request to the second device according to the specified registration identity and the correspondence between the user identifier information and the registration identity by: searching the correspondence between the user identifier information and the registration identity according to the specified registration identity, to determine specified user identifier information matching the specified registration identity; and sending the data push request to the second device according to the specified user identifier information.

906: After receiving the data push request, the second device sends the second message to the proxy device.

The proxy device (agent) is a push service of an operating system of the second device. The proxy device stores privacy data of the user. The privacy data may be set by the user according to the following rules:

Rule 1: For any application (for example, a communications application, a short message service message, WeChat, or a mail), the user may set an application program level of the application to privacy data, push messages of the application are all processed as privacy messages, and specific content of the push messages is not displayed when a screen is not unlocked.

Rule 2: For a contact (for example, a privacy contact, a bank customer service, or Alipay), a user may set a contact level of the contact to privacy data, and the contact may be obtained by means of matching in an application program address book, a system address book, or a mailbox contact address book. Messages sent by the contact are all processed as privacy messages no matter whether the messages are sent by a mail or another communications tool such as WeChat. Specific content of push messages is not displayed when a screen is not unlocked.

Rule 3: For a keyword (for example, a transaction volume, receiving an expense receipt, or a short message service verification code), a user may set the keyword to privacy data, and the keyword may be automatically identified by a system responsible for processing a privacy message. Push messages including the keyword are all processed as privacy messages, and specific content of the push messages is not displayed when a screen is not unlocked.

Rule 4: For user equipment in some time periods (for example, a working period, and a gathering period), and user equipment in some places (for example, a company, and outside), a location relationship between a user and the second device is detected by means of a bound wearable device, and different privacy processing manners are selected for push messages according to connection relationships of devices such as a bound vehicle-mounted device and a smart home device. Determining may be performed for the foregoing time periods, places, bound wearable devices separately, or determining may be performed comprehensively according to the foregoing factors.

907: The proxy device determines, according to the stored privacy data, whether the second message is a privacy message.

In this embodiment of the present invention, the proxy device may determine, according to the stored privacy data, whether the second message is a privacy message by: determining whether the second message matches any data in the privacy data; and if the second message matches any data in the privacy data, determining that the second message is a privacy message; or if the second message does not match any data in the privacy data, determining that the second message is not a privacy message, and ending a processing procedure.

Using an example in which the privacy data is a relatively sensitive keyword (for example, a transaction volume, receiving an expense receipt, or a short message service verification code), word segmentation processing may be performed on the first message, to obtain segmented words; the segmented words are separately compared with the privacy data; and if any segmented word matches one keyword in the privacy data, it is determined that the first message is a privacy message.

For privacy data of other types, a processing process is similar to the foregoing process, and details are not described herein again.

908: When determining that the second message is a privacy message, the proxy device processes the second message, and sends the processed second message to the second device.

The second message may include multiple pieces of relatively sensitive privacy content. For example, when the second message is a delivery message of an online payment verification code, the second message may include multiple pieces of privacy content such as an amount, a bank card number, and a verification code.

In this case, it may be selected that some privacy content in the second message is replaced, hidden, or modified, so that the second message includes only some privacy content when being displayed on the notification screen; or it may be selected that all privacy content in the second message is replaced, hidden, or modified, so that the second message does not include any privacy content when being displayed on the notification screen. In this case, the second message does not include any sensitive word.

909: The second device displays a notification of the processed second message on a notification screen.

In this embodiment of the present invention, when displaying the notification of the processed second message on the notification screen, the second device skips displaying a notification preview of the second message, where the skipping displaying a notification preview of the second message refers to: when displaying the notification of the second message, skipping displaying specific content of the second message, and displaying only outline notification information that does not include the specific content of the second message.

Preferably, to prevent leakage of user privacy, the notification preview of the second message may not be displayed on the notification screen, that is, no related sensitive word is displayed. Only an outline notification message in a form such as "You have ** new messages", or "You have a new transfer record" is displayed, which is not specifically limited in this embodiment of the present invention.

In addition, after a general message is displayed, unlock prompt information may be further displayed on a lock screen interface, to prompt the user to perform an unlocking operation, to view the message.

According to the method provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Figure 10:
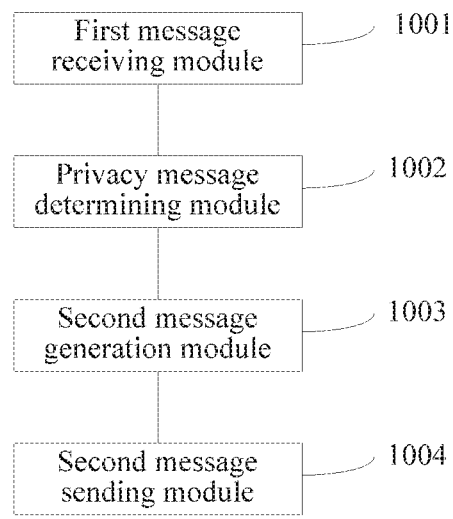
FIG. 10 is a schematic structural diagram of a message processing apparatus according to an embodiment of the present invention.

FIG. 10 is a schematic structural diagram of a message processing apparatus according to an embodiment of the present invention. The apparatus is applied to an application server. Referring to FIG. 10, the apparatus includes: a first message receiving module 1001, a privacy message determining module 1002, a second message generation module 1003, and a second message sending module 1004.

The first message receiving module 1001 is configured to receive a first message sent by a first device to a second device; the privacy message determining module 1002 is connected to the first message receiving module 1001, and is configured to determine whether the first message is a privacy message; the second message generation module 1003 is connected to the privacy message determining module 1002, and is configured to: when the first message is a privacy message, generate a second message according to the first message, where the second message carries a first privacy label; and the second message sending module 1004 is connected to the second message generation module 1003, and is configured to send the second message to the second device, so that the second device displays a notification of the second message on a notification screen according to the first privacy label after receiving the second message.

Optionally, the privacy message determining module is configured to determine, according to privacy data included in the first message, that the first message is a privacy message; and correspondingly, the second message generation module is configured to generate the second message according to the first message, and set the first privacy label in the second message.

Optionally, the privacy message determining module is configured to determine, according to a second privacy label included in the first message, that the first message is a privacy message; and correspondingly, the second message generation module is configured to generate the second message according to the first message, and set the first privacy label in the second message.

Optionally, the second message sending module is configured to send a second message to the second device, so that the second device skips displaying a notification preview of the second message on the notification screen of the second device after receiving the second message.

According to the apparatus provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Figure 11:
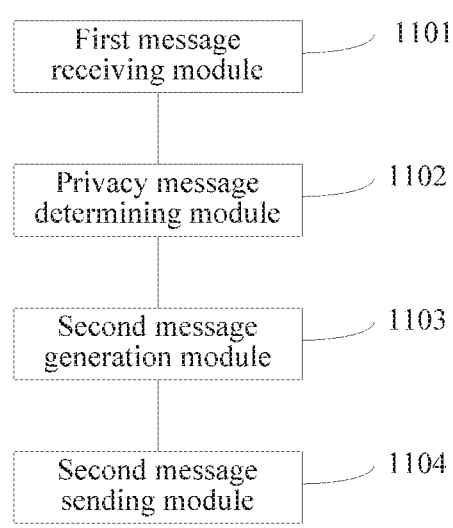
FIG. 11 is a schematic structural diagram of a message processing apparatus according to an embodiment of the present invention.

FIG. 11 is a schematic structural diagram of a message processing apparatus according to an embodiment of the present invention. The apparatus is applied to an application server. Referring to FIG. 11, the apparatus includes: a first message receiving module 1101, a privacy message determining module 1102, a second message generation module 1103, and a second message sending module 1104. The first message receiving module 1101 is configured to receive a first message sent by a first device to a second device; the privacy message determining module 1102 is connected to the first message receiving module 1101, and is configured to determine whether the first message is a privacy message; the second message generation module 1103 is connected to the privacy message determining module 1102, and is configured to: when the first message is a privacy message, generate a second message according to the first message, where the second message does not include at least one piece of privacy content in the first message; and the second message sending module 1104 is connected to the second message generation module 1103, and is configured to send the second message to the second device, so that the second device displays a notification of the second message on a notification screen after receiving the second message.

Optionally, the privacy message determining module is configured to determine, according to privacy data included in the first message, that the first message is a privacy message; and correspondingly, the second message generation module is configured to remove the at least one piece of privacy content in the first message, to obtain the second message.

According to the apparatus provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Figure 12:
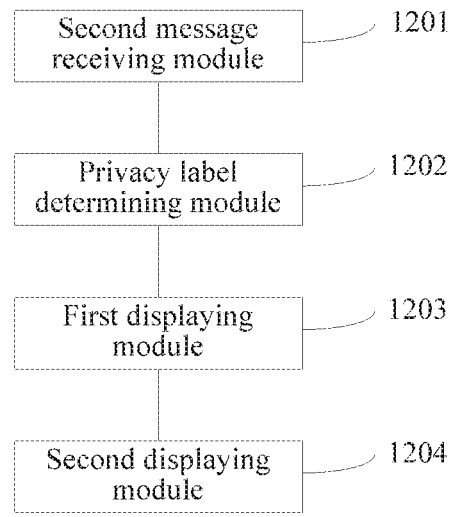
FIG. 12 is a schematic structural diagram of a message processing apparatus according to an embodiment of the present invention.

FIG. 12 is a schematic structural diagram of a message processing apparatus according to an embodiment of the present invention. The apparatus is applied to a second device. Referring to FIG. 12, the apparatus includes: a second message receiving module 1201, a privacy label determining module 1202, a first displaying module 1203, and a second displaying module 1204.

The second message receiving module 1201 is configured to receive a second message sent to the second device; the privacy label determining module 1202 is connected to the second message receiving module 1201, and is configured to determine whether the second message includes a privacy label; the first displaying module 1203 is connected to the privacy label determining module 1202, and is configured to: when the second message includes a privacy label, display, by the second device, a notification of the second message on a notification screen, and skip displaying a notification preview of the second message; and the second displaying module 1204 is connected to the first displaying module 1203, and is configured to: when the second message does not include a privacy label, display the notification of the second message on the notification screen of the second message according to a user setting.

Optionally, the first displaying module is configured to: when displaying the notification of the second message, skip displaying specific content of the second message, and display only outline notification information that does not include the specific content of the second message.

According to the apparatus provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Figure 13:
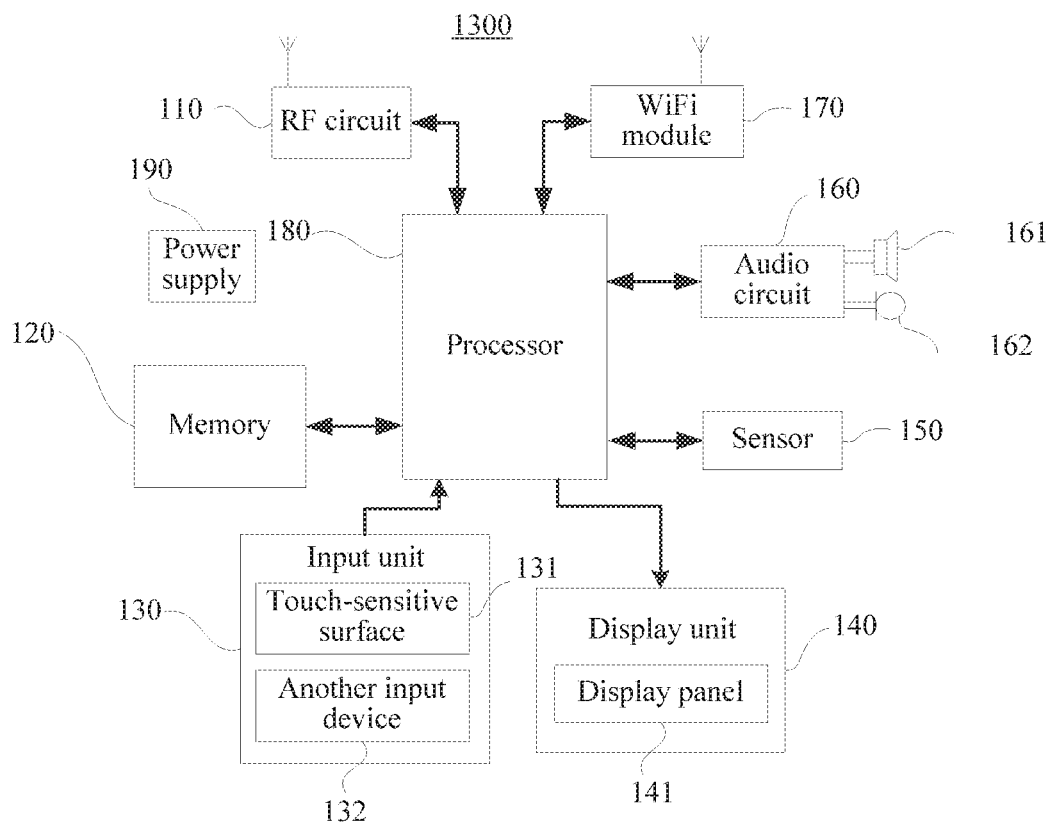
FIG. 13 is a schematic structural diagram of a terminal according to an embodiment of the present invention.

FIG. 13 shows a terminal according to an embodiment of the present invention. The terminal may be configured to execute the message processing method executed by a second device in the foregoing embodiment. Referring to FIG. 13, a terminal 1300 includes an RF (Radio Frequency) circuit 110, a memory 120 including one or more computer readable storage media, an input unit 130, a display unit 140, a sensor 150, an audio circuit 160, a WiFi (Wireless Fidelity, wireless fidelity) module 170, a processor 180 including one or more processing cores, a power supply 190, and other components. A person skilled in the art may understand that a terminal structure shown in FIG. 13 constitutes no limitation to the terminal, and the terminal may include more or fewer components than those shown in the figure, or some components may be combined, or a different component deployment may be used.

The RF circuit 110 may be configured to receive and send signals during an information receiving and sending process or a call process, particularly, after receiving downlink information of a base station, deliver the downlink information of the base station to the one or more processors 180 for processing, and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, an LNA (Low Noise Amplifier, low noise amplifier), and a duplexer. In addition, the RF circuit 110 may also communicate with a network and another device by means of wireless communication. The wireless communication may use any communications standard or protocol, including but not limited to: GSM (Global System of Mobile communication), GPRS (General Packet Radio Service), CDMA (Code Division Multiple Access), WCDMA (Wideband Code Division Multiple Access), LTE (Long Term Evolution), e-mail, and SMS (Short Messaging Service).

The memory 120 may be configured to store a software program and module. The processor 180 runs the software program and module stored in the memory 120, to implement various functional applications and data processing. The memory 120 may mainly include a program storage area and a data storage area, where the program storage area may store an operating system, an application program required by at least one function (such as a sound playback function and an image display function), and the like; and the program storage area may store data (such as audio frequency data and an address book) created according to the use of the terminal 1300, and the like. In addition, the memory 120 may include a high-speed random access memory, or may include a non-volatile memory such as at least one disk storage device, a flash storage device, or another volatile solid-state storage device. Correspondingly, the memory 120 may further include a memory controller, so as to provide access of the processor 180 and the input unit 130 to the memory 120.

The input unit 130 may be configured to receive input figure or character information, and generate a keyboard, mouse, joystick, optical, or trackball signal input related to a user setting and function control. Specifically, the input unit 130 may include a touch-sensitive surface 131 and another input device 132. The touch-sensitive surface 131, which may also be referred to as a touch display screen or a touch panel, may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a trackball, a mouse, and a joystick.

The display unit 140 may be configured to display information input by the user or information provided for the user, and various graphical user screens of the terminal 1300. These graphical user screens may be formed by a graph, a text, an icon, a video, or any combination thereof. The display unit 140 may include a display panel 141. Optionally, the display panel 141 may be configured by using an LCD (Liquid Crystal Display), an OLED (Organic Light-Emitting Diode), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 13, the touch-sensitive surface 131 and the display panel 141 are used as two separate components to implement input and output functions, in some embodiments, the touch-sensitive surface 131 and the display panel 141 may be integrated to implement the input function and output functions.

The terminal 1300 may further include at least one sensor 150, for example, an optical sensor, a motion sensor and other sensors. Specifically, the optical sensor may include an ambient light sensor and a proximity sensor, where the ambient light sensor may adjust luminance of the display panel 141 according to brightness of the ambient light. The proximity sensor may switch off the display panel 141 and/or backlight when the terminal 1300 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 1300 are not further described herein.

The audio circuit 160, a loudspeaker 161, and a microphone 162 may provide an audio screen between the user and the terminal 1300. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another apparatus by using the RF circuit 110, or outputs the audio data to the memory 120 for further processing. The audio circuit 160 may further include an earplug jack, so as to provide communication between a peripheral earphone and the terminal 1300.

WiFi is a short distance wireless transmission technology. The terminal 1300 may help, by using the WiFi module 170, the user to receive and send e-mails, browse a webpage, access streaming media, and so on, which provides wireless broadband Internet access for the user.

The processor 180 is a control center of the terminal 1300, and is connected to various parts of the mobile phone by using various screens and lines. By running or executing the software program and/or module stored in the memory 120, and invoking data stored in the memory 120, the processor 180 performs various functions and data processing of the terminal 1300, thereby performing overall monitoring on the mobile phone. Optionally, the processor 180 may include one or more processing cores. Preferably, the processor 180 may integrate an application processor and a modem. The application processor mainly processes an operating system, a user screen, an application program, and the like. The modem mainly processes wireless communication. It may be understood that the foregoing modem processor may be not integrated into the processor 180.

The terminal 1300 may further include the power supply 190 (for example, a battery) that supplies power for various components. Preferably, the power supply may be logically connected to the processor 180 by using a power management system, so as to implement a function such as charging, discharging and power consumption management by using the power management system. The power supply 190 may further include one or more of a direct current or alternate current power supply, a re-charging system, a power supply fault detection circuit, a power supply converter or an inverter, a power supply state indicator, and any other components.

Although not shown in the figure, the terminal 1300 may further include a camera, a Bluetooth module, and the like, and details are not described herein. Specifically, in this embodiment, the display unit of the terminal is a touch screen display, and the terminal further includes a memory and one or more programs, where the one or more programs are stored in the memory, and are configured to be executed by one or more processors. The one or more programs include instructions for performing the following operations: receiving a first message sent by a first device to a second device; determining whether the first message is a privacy message; if the first message is a privacy message, generating a second message according to the first message, where the second message carries a first privacy label; and sending the second message to the second device, so that the second device displays a notification of the second message on a notification screen according to the first privacy label after receiving the second message.

Optionally, the determining whether the first message is a privacy message includes: determining, according to privacy data included in the first message, that the first message is a privacy message; and correspondingly, the generating a second message according to the first message includes: generating the second message according to the first message, and setting the first privacy label in the second message.

Optionally, the determining whether the first message is a privacy message includes: determining, according to a second privacy label included in the first message, that the first message is a privacy message; and correspondingly, the generating a second message according to the first message includes: generating the second message according to the first message, and setting the first privacy label in the second message.

Optionally, the displaying a notification of the second message on a notification screen according to the first privacy label includes: skipping displaying a notification preview of the second message on the notification screen of the second device.

According to the terminal provided in this embodiment of the present invention, after receiving a first message sent to a second device, an application server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

Figure 14:
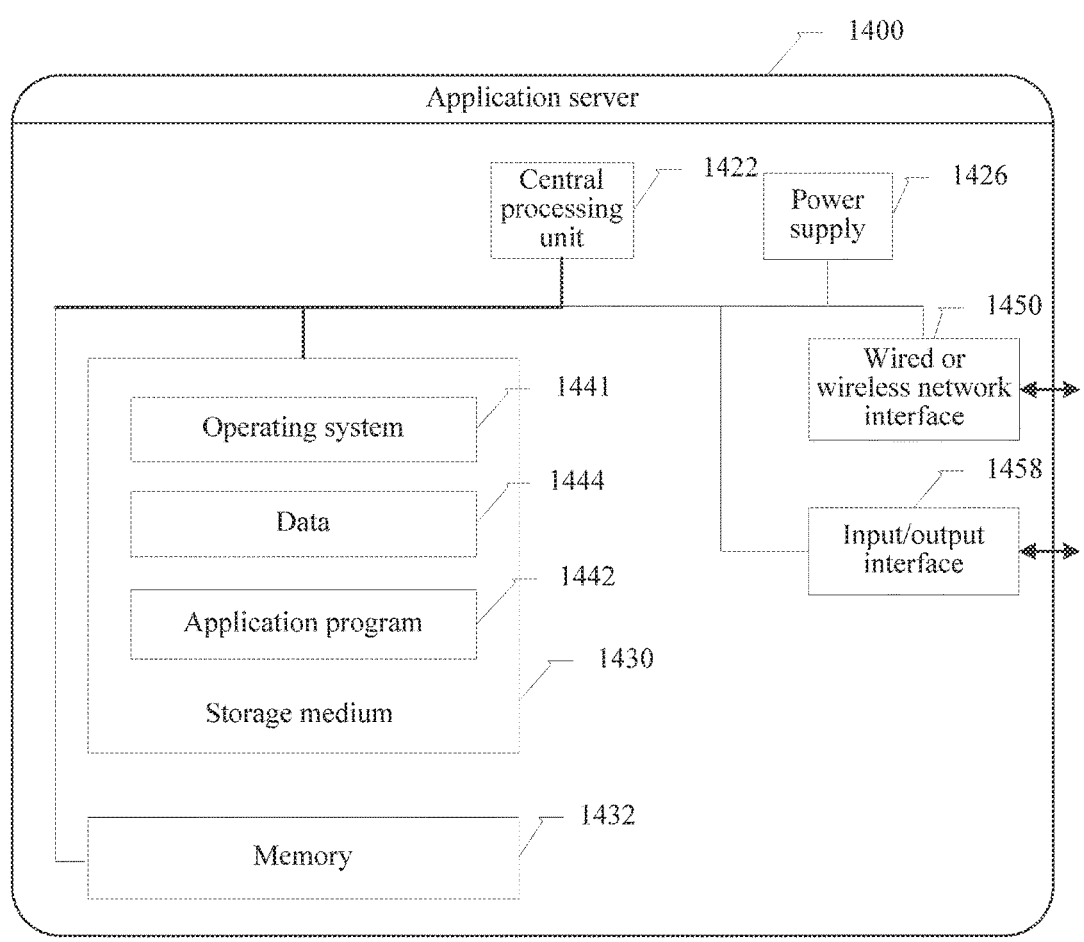
FIG. 14 is a schematic structural diagram of an application server according to the present invention embodiment.

An embodiment provides an application server, where the application server may be configured to execute the message processing method provided in the foregoing embodiment. Referring to FIG. 14, a great difference may be generated due to different configurations or performance of a server 1400, and the server 1400 may include one or more central processing units (CPUs) 1422 (for example, one or more processors), a memory 1432, and one or more storage media 1430 storing an application program 1442 or data 1444 (for example, one or more mass storage devices). The memory 1432 and the storage medium 1430 may be transient storage or persistent storage. A program stored in the storage medium 1430 may include one or more modules (not shown in the figure), and each module may operate a series of instructions of the server. Further, the central processing unit 1422 may be set to communicate with the storage medium 1430, and executes, on the server 1400, a series of instruction operations in the storage medium 1430.

The server 1400 may further include one or more power supplies 1426, one or more wired or wireless network screens 1450, one or more input/output screens 1458, and/or, one or more operating systems 1441, for example, Windows Server™, Mac OS X™, Unix™, Linux™, and FreeBSD™.

Specifically, in this embodiment, one or more processors are configured to execute one or more programs, to perform the following operations: receiving a second message sent to a second device; determining whether the second message includes a privacy label; when the second message includes a privacy label, skipping displaying a notification preview of the second message when the second device displays a notification of the second message on a notification screen; and when the second message does not include a privacy label, displaying the notification of the second message on the notification screen of the second message according to a user setting.

Optionally, the skipping displaying a notification preview of the second message includes: when displaying the notification of the second message, skipping displaying specific content of the second message, and displaying only outline notification information that does not include the specific content of the second message.

According to the server provided in this embodiment of the present invention, after receiving a first message sent to a second device, the server determines whether the first message is a privacy message; if the first message is a privacy message, generates, according to the first message, a second message carrying a first privacy label; and then, sends the second message to the second device, so that the second device displays a notification of the second message on a notification screen according to the first privacy label after receiving the second message. After the second device receives the second message, because the second message may be displayed according to whether the second message carries a first privacy label, an objective that the second device displays message content of different granularities is achieved, so that not only a user can learn an important notification message in time, but also leakage of user privacy can be prevented, thereby improving user experience and usability of a device. In addition, an application program does not need to be running in the background all the time, which is relatively power-saving.

It should be noted that: when the message processing apparatus provided in the foregoing embodiment processes a message, only divisions of the foregoing functional modules are described by using an example. In actual application, the foregoing functions may be allocated to different functional modules for execution according to requirements, that is, an internal structure of the apparatus is divided into different functional modules, to complete all or a part of the foregoing described functions. In addition, the message processing apparatus and the message processing method embodiment that are provided in the foregoing embodiments belong to the same idea, and for a specific implementation process, refer to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method comprising:
   receiving, by a server, from a second device, specified user identifier information of the second device;
   receiving, by the server, from the second device, a privacy data set by a user of the second device;
   storing, by the server, a correspondence between the specified user identifier information and the privacy data set;
   receiving, by the server, a first message sent by a first device to the second device;
   searching, by the server, the correspondence between the privacy data and the specified user identifier information of the second device to determine the privacy data matching the specified user identifier information of the second device;
   in response to searching the correspondence, determining, by the server, whether the first message comprises privacy data;
   when the first message comprises privacy data, generating, by the server, a second message according the first message by removing the privacy data from the first message; and
   sending, by the server, the second message to the second device, so that the second device displays a notification of the second message on a lock screen interface after receiving the second message;
   wherein the second message comprises the first message without the privacy data, until after a verification of an unlocking operation by the second device.

2. The method according to claim 1, wherein each of the first message and the second message is one of a short message service message, an instant message, and a mail message.

3. The method according to claim 1, wherein each of the first device and the second device is one of a smartphone, a tablet computer, and a personal computer.

4. A method comprising:
   sending to a server, by a receiving device, specified user identifier information of the receiving device, and a privacy data set by a user of the receiving device, wherein the server stores a correspondence between the specified user identifier information and the privacy data set;

displaying, by the receiving device, a lock screen interface;

receiving, by the receiving device, a message from the server;

displaying, by the receiving device, a notification of the message on the lock screen interface, wherein privacy data in the message is replaced by a specified character in the notification of the message;

displaying, by the receiving device, unlock prompt information on the lock screen interface to prompt a user to perform an unlocking operation;

receiving, by the receiving device, an unlocking operation from the user;

verifying, by the receiving device, the unlocking operation; and after verifying the unlocking operation, displaying, by the receiving device, the message including the privacy data;

wherein receiving, by the receiving device, the message from the server comprises receiving, by the receiving device, the message from the server, after the server has:

received an original message from a sending device for the receiving device;

determined that the original message is a privacy message by searching the correspondence between the privacy data and the specified user identifier information of the receiving device; and generated the message by removing the privacy data from the original message for the receiving device; and wherein the message received by the receiving device from the server comprises the original message without the privacy data, until after the unlocking operation has been verified.

5. The method according to claim 4, wherein the message is one of a short message service message, an instant message, and a mail message.

6. The method according to claim 4, wherein the specified character is "*".

7. The method according to claim 4, wherein the privacy data comprises one of a transaction volume, an expense receipt, and a short message service verification code.

8. The method according to claim 4, wherein the receiving device is one of a smartphone, a tablet computer, and a personal computer.

9. The method according to claim 4, wherein the receiving device comprises a smartphone, a tablet computer, or a personal computer.

10. The method according to claim 4, wherein the message comprises a short message server message, an instant message, or a mail message.

11. The method according to claim 4, wherein the sending device comprises a smartphone, a tablet computer, or a personal computer.

12. The method according to claim 4, wherein the original message comprises a short message server message, an instant message, or a mail message.

13. A device, comprising:

a processor; and a non-transitory computer readable storage medium storing a program for execution by the processor, the program including instructions for:

sending, to a server, specified user identifier information of the device, and a privacy data set by a user of the device, wherein the server stores a correspondence between the specified user identifier information and the privacy data set;

displaying a lock screen interface;

receiving a message from a server;

displaying a notification of the message on the lock screen interface, wherein privacy data in the message is replaced by a specified character in the notification of the message;

displaying unlock prompt information on the lock screen interface to prompt a user to perform an unlocking operation;

receiving an unlocking operation from the user;

verifying the unlocking operation; and after verifying the unlocking operation, displaying the message including the privacy data;

wherein the message that is received from the server is transmitted by the server to the device, after the server has:

received an original message from a source device for the device;

determined that the original message is a privacy message by searching the correspondence between the privacy data and the specified user identifier information of the device; and generated the message by removing the privacy data from the original message for the device; and wherein the message received by the device from the server comprises the original message without the privacy data, until after the unlocking operation has been verified.

14. The device according to claim 13, wherein the message is one of a short message service message, an instant message, and a mail message.

15. The device according to claim 13, wherein the specified character is "*".

16. The device according to claim 13, wherein the privacy data comprises one of a transaction volume, an expense receipt, and a short message service verification code.

17. The device according to claim 13, wherein the device is one of a smartphone, a tablet computer, and a personal computer.

* * * * *